(12) United States Patent
Ederer et al.

(10) Patent No.: US 11,077,611 B2
(45) Date of Patent: Aug. 3, 2021

(54) METHOD AND DEVICE FOR PRODUCING 3D SHAPED ARTICLES WITH A DOUBLE RECOATER

(71) Applicant: Voxeljet AG, Friedberg (DE)

(72) Inventors: Ingo Ederer, Geltendorf (DE); Bastian Heymel, Augsburg (DE)

(73) Assignee: VOXELJET AG, Friedberg (DE)

( * ) Notice: Subject to any disclaimer, the term of this patent is extended or adjusted under 35 U.S.C. 154(b) by 477 days.

(21) Appl. No.: 15/558,462

(22) PCT Filed: Mar. 10, 2016

(86) PCT No.: PCT/DE2016/000106
§ 371 (c)(1),
(2) Date: Sep. 14, 2017

(87) PCT Pub. No.: WO2016/146095
PCT Pub. Date: Sep. 22, 2016

(65) Prior Publication Data
US 2018/0079133 A1 Mar. 22, 2018

(51) Int. Cl.
| | | |
|---|---|---|
| *B29C 64/165* | (2017.01) | |
| *B29C 31/02* | (2006.01) | |
| *B33Y 10/00* | (2015.01) | |
| *B33Y 30/00* | (2015.01) | |
| *B33Y 40/00* | (2020.01) | |
| *B05C 19/04* | (2006.01) | |
| *B29C 64/214* | (2017.01) | |

(52) U.S. Cl.
CPC ............ *B29C 64/165* (2017.08); *B05C 19/04* (2013.01); *B29C 31/02* (2013.01); *B29C 64/214* (2017.08); *B33Y 10/00* (2014.12); *B33Y 30/00* (2014.12); *B33Y 40/00* (2014.12)

(58) Field of Classification Search
CPC .... B29C 64/165; B29C 64/209; B29C 64/214
See application file for complete search history.

(56) References Cited

U.S. PATENT DOCUMENTS

| | | | |
|---|---|---|---|
| 4,247,508 | A | 1/1981 | Housholder |
| 4,575,330 | A | 3/1986 | Hull |
| 4,665,492 | A | 5/1987 | Masters |
| 4,752,352 | A | 6/1988 | Feygin |
| 4,752,498 | A | 6/1988 | Fudim |
| 4,944,817 | A | 7/1990 | Bourell et al. |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420 A, 06/1990, Deckard (withdrawn)

(Continued)

*Primary Examiner* — Matthew J Daniels
*Assistant Examiner* — Shibin Liang
(74) *Attorney, Agent, or Firm* — The Dobrusin Law Firm, P.C.

(57) ABSTRACT

The invention relates to a method and device for producing 3D moulded parts by means of a layer construction technique wherein a recoater is used which can coat in both directions of movement.

2 Claims, 32 Drawing Sheets

(56) References Cited

U.S. PATENT DOCUMENTS

| | | |
|---|---|---|
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,155,324 A | 10/1992 | Deckard et al. |
| 5,156,697 A | 10/1992 | Bourell et al. |
| 5,248,456 A | 8/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A * | 5/1999 | Almquist ............... B29C 41/12 |
| | | 264/401 |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,799,959 B1 | 10/2004 | Tochimoto et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,748,971 B2 * | 7/2010 | Hochsmann ............ B05D 1/26 |
| | | 425/90 |
| 7,790,096 B2 | 9/2010 | Merot et al. |
| 7,799,253 B2 | 9/2010 | Höschmann et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |

(56) References Cited

U.S. PATENT DOCUMENTS

| | | |
|---|---|---|
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0156263 A1 | 7/2008 | Montero-Escuder et al. |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0044903 A1* | 2/2010 | Rhoades .............. B22F 3/26 264/69 |
| 2010/0212584 A1 | 8/2010 | Ederer et al. |
| 2010/0207288 A1 | 9/2010 | Enrico |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1 | 4/2015 | Hartmann et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0367415 A1* | 12/2015 | Buller ............... B23K 26/346 419/53 |
| 2015/0375419 A1 | 12/2015 | Gunther et al. |
| 2016/0318251 A1 | 3/2016 | Ederer et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0050378 A1 | 2/2017 | Ederer |
| 2017/0106595 A1 | 4/2017 | Gunther et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0043615 A1* | 2/2018 | Hochsmann ........... B33Y 99/00 |
| 2018/0141271 A1 | 5/2018 | Gunter et al. |
| 2018/0326662 A1 | 11/2018 | Gunther et al. |
| 2018/0369910 A1 | 12/2018 | Gunter et al. |
| 2019/0047218 A1 | 2/2019 | Ederer et al. |
| 2019/0084229 A1 | 3/2019 | Gunther |

FOREIGN PATENT DOCUMENTS

| | | | |
|---|---|---|---|
| DE | 3221357 A1 | 12/1983 | |
| DE | 3930750 C2 | 3/1991 | |
| DE | 4102260 A1 | 7/1992 | |
| DE | 4305201 C1 | 4/1994 | |
| DE | 4 325 573 A1 | 2/1995 | |
| DE | 29506204 U1 | 6/1995 | |
| DE | 4440397 | 9/1995 | |
| DE | 19530295 C1 | 1/1997 | |
| DE | 19528215 A1 | 2/1997 | |
| DE | 29701279 U1 | 5/1997 | |
| DE | 19545167 A1 | 6/1997 | |
| DE | 69031808 T2 | 4/1998 | |
| DE | 19853834 | 5/2000 | |
| DE | 69634921 T2 | 12/2005 | |
| DE | 201 22 639 U1 | 11/2006 | |
| DE | 102006040305 A1 | 3/2007 | |
| DE | 102006029298 A1 | 12/2007 | |
| DE | 102007040755 A1 | 3/2009 | |
| DE | 102007047326 A1 | 4/2009 | |
| DE | 102011053205 A1 | 3/2013 | |
| EP | 0361847 B1 | 4/1990 | |
| EP | 0431924 A2 | 6/1991 | |
| EP | 1415792 | 5/2004 | |
| EP | 1457590 A | 9/2004 | |
| EP | 2202016 A1 * | 6/2010 | ........... B29C 64/153 |
| EP | 2 191 922 B1 | 1/2011 | |
| GB | 2297516 A | 8/1996 | |
| JP | S62275734 A | 11/1987 | |
| JP | 2003/136605 A | 5/2003 | |
| JP | 2004/082206 A | 3/2004 | |
| JP | 2009/202451 A | 9/2009 | |
| WO | 90/03893 A1 | 4/1990 | |
| WO | 01/40866 A2 | 6/2001 | |
| WO | 2004/014637 A1 | 2/2004 | |
| WO | 2006/100166 A1 | 9/2006 | |
| WO | 2008/049384 A1 | 5/2008 | |
| WO | 2008/061520 A2 | 5/2008 | |
| WO | 2011/063786 A1 | 6/2011 | |
| WO | 2013/075696 A1 | 5/2013 | |
| WO | 2014/090207 A1 | 6/2014 | |
| WO | 2014/166469 A1 | 10/2014 | |
| WO | 2016/019942 A1 | 2/2016 | |
| WO | 2017/008777 A1 | 1/2017 | |

OTHER PUBLICATIONS

International Search Report and Written Opinion, PCT Application No. PCT/DE2016/000106, dated Jul. 25, 2016.

International Preliminary Report on Patentability, PCT Application No. PCT/DE2016/000106, dated Sep. 19, 2017.

Marcus et al., Solid Freedom Fabrication Proceedings, Nov. 1993.

Cima et al., "Computer-derived Microstructures by 3D Printing: Bio-and Structural Materials," SFF Symposium, Austin, TX, 1994.

Marcus, et al., Solid Freeform Fabrication Proceedings, Sep. 1995, pp. 130-133.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine with Brief Summary Feb. 22, 2005.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

Williams, "Feasibility Study of Investment Casting Pattern Design by Means of Three Dimensional Printing", Department of Mechanical Engineering, abstract only; Sep. 25, 2001.

Armin Scharf, "Erster 3D-Endlosdrucker", zwomp.de, http://www.zwomp.de/2012/11/06/voxeljet-endlosdrucker/ dated Nov. 6, 2012.

(56) References Cited

OTHER PUBLICATIONS

Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

* cited by examiner

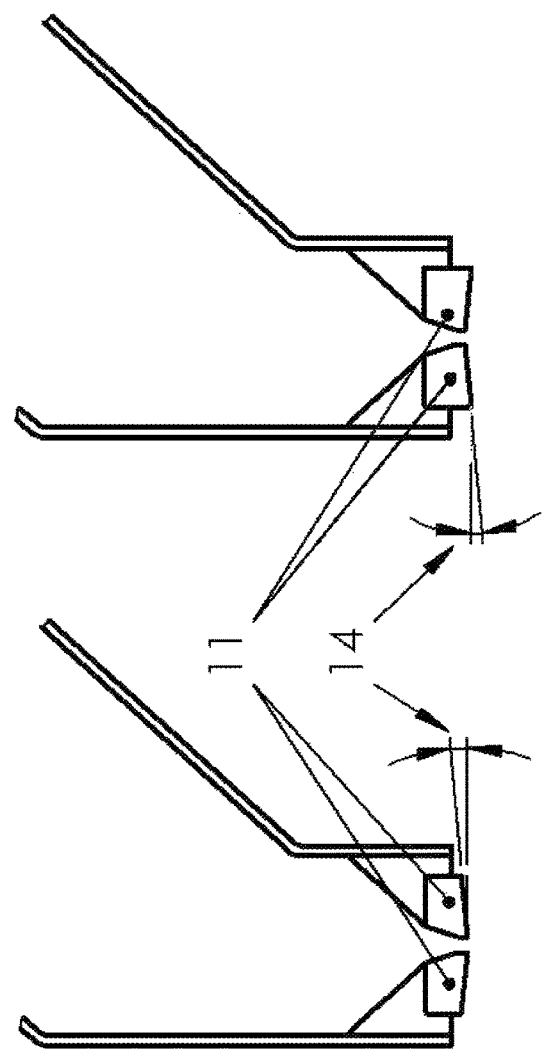
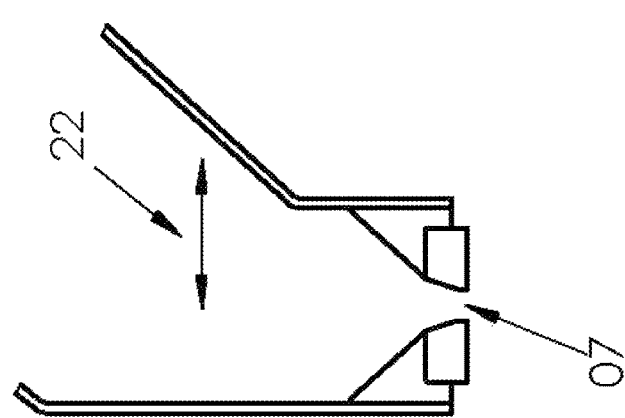
FIG. 6

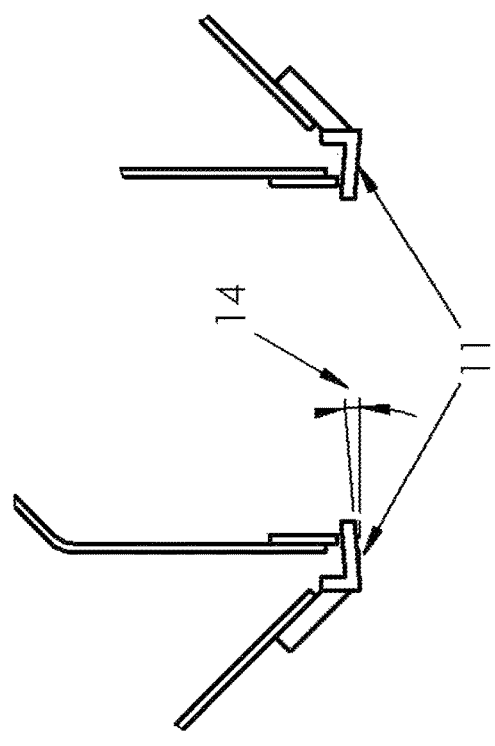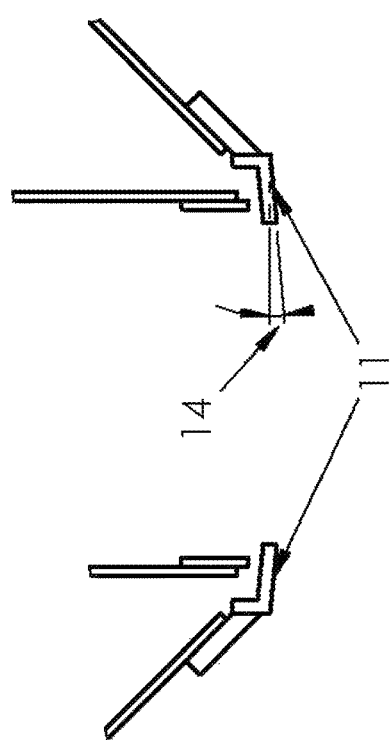
FIG. 18

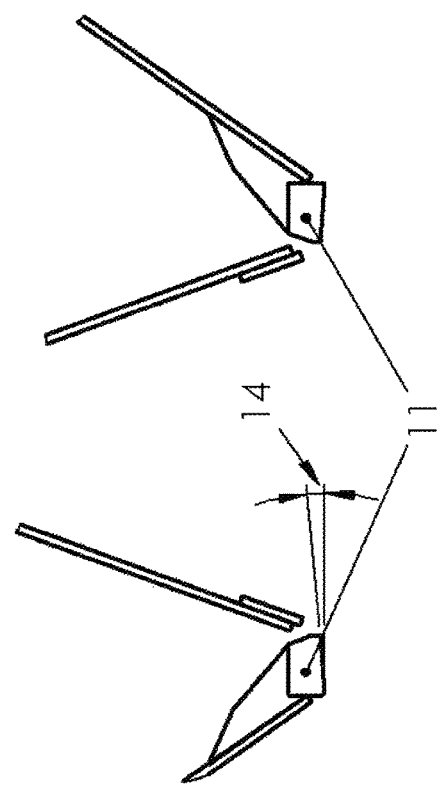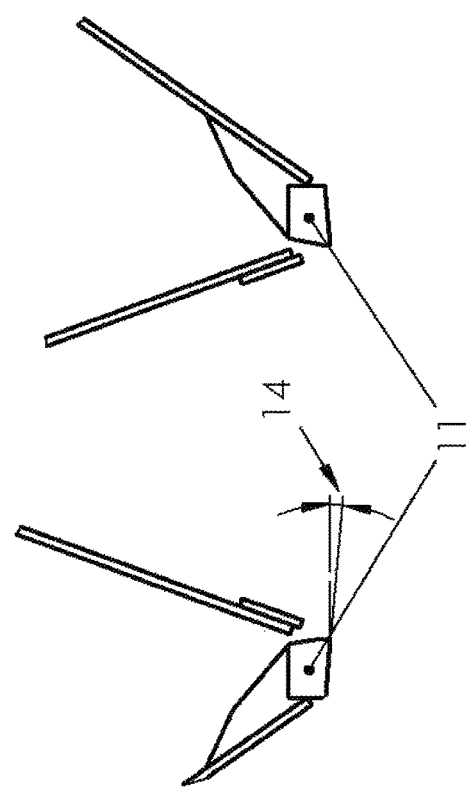
FIG. 22

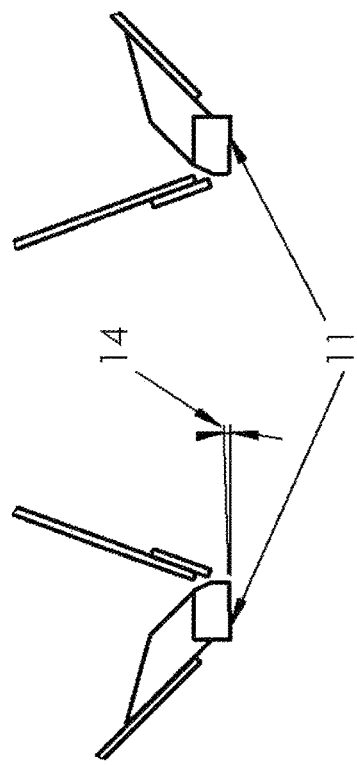
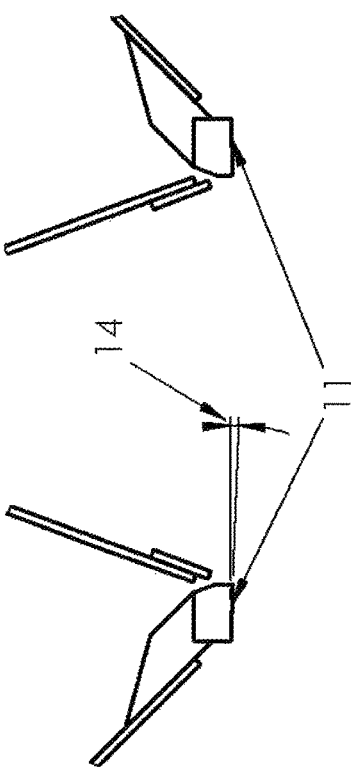
FIG. 30

METHOD AND DEVICE FOR PRODUCING 3D SHAPED ARTICLES WITH A DOUBLE RECOATER

CLAIM OF PRIORITY

This application is a national phase filing under 35 USC § 371 from PCT Application serial number PCT/DE2016/000106 filed on Mar. 10, 2016, and claims priority therefrom. This application further claims priority from German Patent Application DE 10 2015 003 372.7 filed on Mar. 17, 2015. PCT/DE2016/000106 and DE 10 2015 003 372.7 are each incorporated by reference in its entirety.

FIELD

The invention relates to a method and a device for producing 3D models by means of a layer construction technique, wherein the coater (recoater) can coat in two directions.

BACKGROUND

European Patent EP 0 431 924 B1 describes a process for producing three-dimensional objects based on computer data. In the process, a thin layer of particulate material is deposited on a platform by means of a coater (recoater) and has a binder material selectively printed thereon by means of a print head. The particulate region with the binder printed thereon bonds and solidifies under the influence of the binder and, optionally, an additional hardener. Next, the construction platform is lowered by one layer thickness or the coater/print head unit is raised and a new layer of particulate material is applied, the latter also being printed on selectively as described above. These steps are repeated until the desired height of the object is achieved. Thus, the printed and solidified regions form a three-dimensional object (moulded part).

Upon completion, the object made of solidified particulate material is embedded in loose particulate material, from which it is subsequently freed. For this purpose a suction device may be used, for example. This leaves the desired objects which are then further cleaned of any residual powder, e.g. by brushing it off.

Other powder-based rapid prototyping processes, e.g. selective laser sintering or electron beam sintering, work in a similar manner, also applying loose particulate material layer by layer and selectively solidifying it using a controlled physical source of radiation.

In the following, all these processes will be summarised by the term "three-dimensional printing method" or "3D printing method".

Some of these methods use different means for coating. In some methods, the particulate material required for the entire layer is placed in front of a thin blade. The latter is then moved over the construction area, spreading the furnished material and thereby smoothing it. Another type of layer application consists in continuously placing a small volume of particulate material in front of the blade as it moves. For this purpose, the blade is usually mounted to the underside of a movable silo. Directly above or next to the blade, an adjustable gap is provided through which the particulate material can discharge from the silo. The discharge is stimulated by introducing oscillations into the silo/blade system.

These known prior art devices comprise coating systems which allow particles to be applied in one direction only. In doing so, the particulate material is applied during a passage over the construction field in one direction, after which the coater is returned to its starting position without carrying out a coating operation. The print head moves either completely independently of the coater or follows the latter and applies the binder immediately after the particulate coating. This results in empty passages of the coater which require process time, thus negatively affecting the volume output per unit of time.

A known machine and method for producing three-dimensional objects is described in EP 0 644 809 B1 and in DE 10 2006 030 350 A1. In this machine, too, the recoater applies particulate material during a passage over the construction field and is then returned to its starting position. A 3D printing device, double recoater or 3D printing method according to the present invention is neither disclosed nor anticipated therein.

The volume output per unit of time, already mentioned above, is an important cost-effectiveness factor of 3D printing systems. It is computed on the basis of the time it takes a 3D printing system to print one layer and on the volume output per layer. The coating time is the sum of all times which a 3D printing system requires for the process steps of layer application, solidification of the coated areas, lowering the construction platform into the construction cylinder (construction space), as well as for sub-steps such as refilling the particulate material, cleaning the solidifying means, cleaning the coater, or empty passages.

Empty passages of coaters as described above for known 3D printing methods and devices have a negative effect on the process time and the volume output per unit of time.

The coating time is an important cost-effectiveness factor of 3D printing systems. According to the prior art, the process steps and sub-steps may account for the following percentages of the total coating time: 34% layer application, 47% solidification of coated areas, 4% lowering into the construction cylinder, 15% refilling of particulate material and cleaning of the coater. In prior art methods and devices, approx. 7.5% of the total coating time is used for empty passages in layer application. By simply avoiding empty passages of the coater, the coating time of a 3D printing system can be decreased by approx. 7.5%. As a consequence, this would increase performance and, thus, also cost-effectiveness by approx. 8%, thereby avoiding this disadvantage of known devices and methods. The reason for the empty passages of the coater is the single direction of action of the prior art coater.

The solidification systems according to the prior art are double action systems. Known prior art methods and devices do not allow the process steps of solidification of the coated areas and layer application to be actually carried out in parallel, because the coaters they use can carry out the coating operation in one direction only.

The above problems and disadvantages of known methods and devices thus include methodic disadvantages as well as economic disadvantages.

It was therefore an object of the present invention to provide constructional means allowing an improved 3D printing method or at least improving or altogether avoiding the disadvantages of the prior art.

Thus, it was another object of the present invention to provide a method and/or a device allowing the process time to be reduced and the volume output per time unit to be increased, thereby improving the economic aspects of the method and device.

BRIEF SUMMARY OF THE INVENTION

According to one aspect, the object underlying the application is achieved by a device and a method using a coater which allows the process steps of coating/particle application and solidification to be carried out in parallel.

In particular, the object underlying the application is achieved in that a coater has been developed which can apply particulate material in two directions.

Moreover, according to another aspect of the invention the coater and print head can be moved independently of each other and/or can both be moved in several directions, in any case at least in two directions, thereby performing their intended tasks of printing and of selective application of binder, respectively.

In a further aspect, the object underlying the application is also achieved, according to the invention, by using a silo (a reservoir containing particulate material) comprising a vibration means, together with a particulate material application device and two levelling devices, or together with two particulate material application devices and one or two levelling devices. Alternatively, two silos are used, each comprising one particulate material application device and one levelling device, together with one or two vibration devices. These devices may be moved over the construction plane either by a joint displacement unit or may be moved separately.

Optionally, the particulate material application devices are provided to be switchable.

A solution of the invention according to another aspect consist in enabling the process step of layer application by means of a movable silo/blade system in two opposite directions. This allows the process speed to be increased and improved in an advantageous manner.

According to yet another aspect, the angle adjustment of the levelling devices, e.g. of a coating blade, can be carried out individually or by switching for the entire system via a structural element of the entire system.

BRIEF DESCRIPTION OF THE DRAWINGS

FIG. 6 is a cross-sectional view showing features of a recoater having a particle application opening with one discharge gap, two coating blades, and two coating blade supports.

FIG. 18 is a cross-sectional view showing features of a recoater having two particle application openings and changes in the blade angle.

FIG. 22 is a cross-sectional view showing features of blades a recoater having a silo with two chambers.

FIG. 30 is a cross-sectional view showing features of a recoater having two silos and angles of the coating blades.

DESCRIPTION OF THE DRAWINGS

Figure 1:
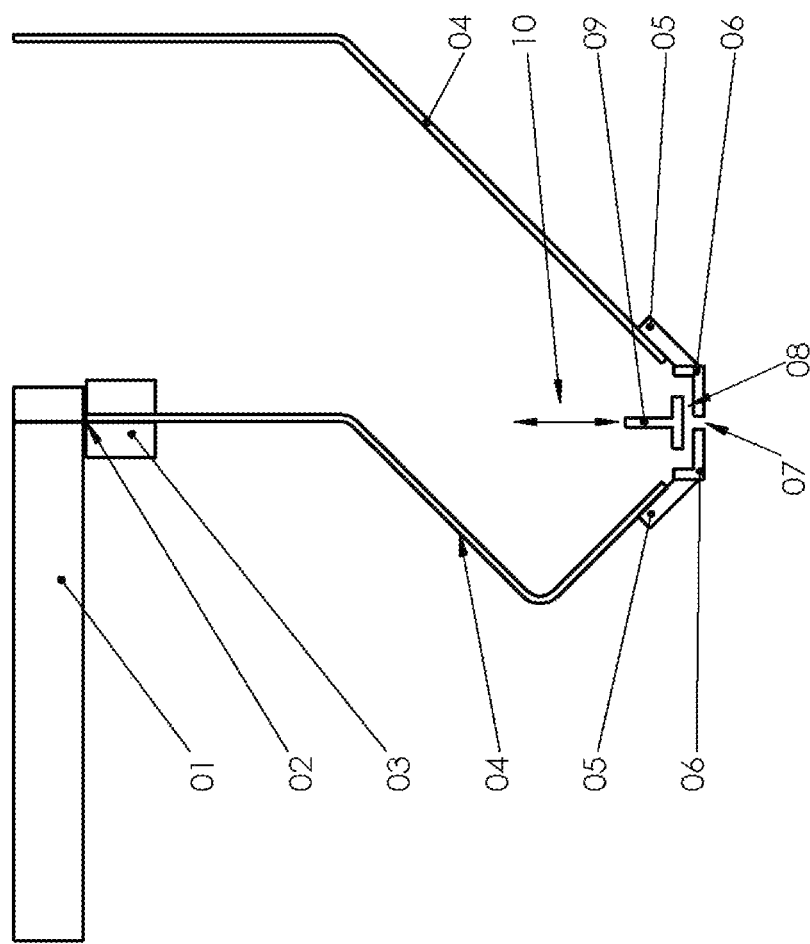
FIG. 1 is a cross-sectional view showing features of a recoater having two sealing gaps, one discharge gap, and two coating blades.
Figure 2:
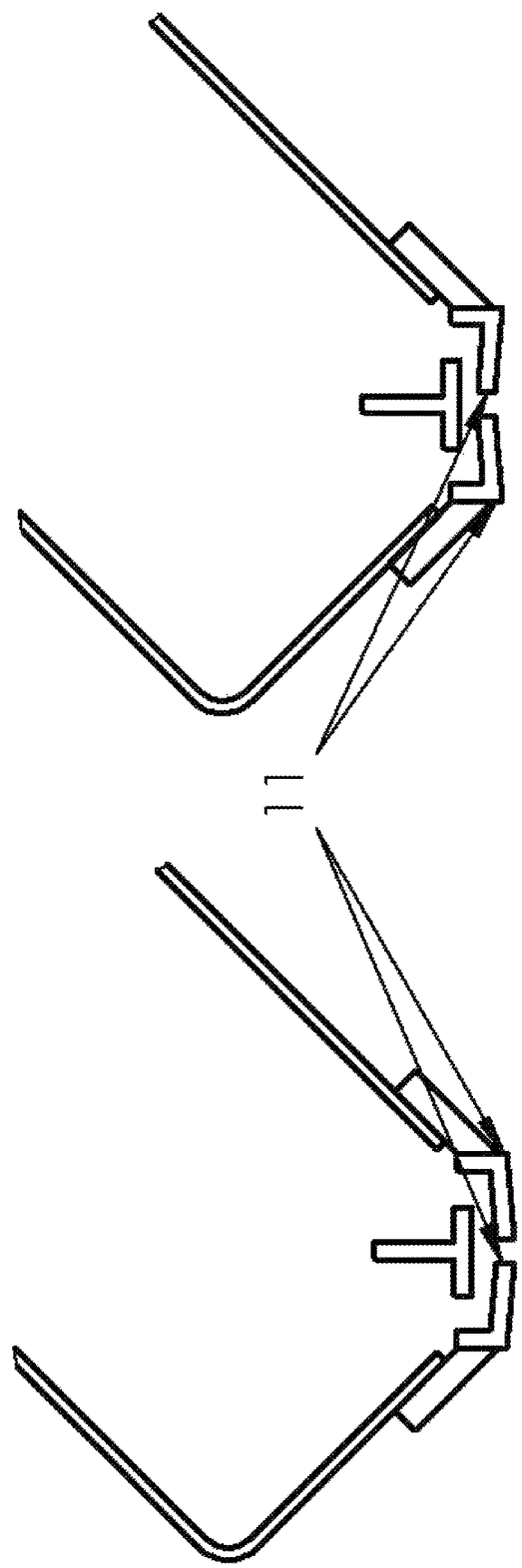
FIG. 2 is a cross-sectional view showing features of a recoater having exchangeable coating blades.

FIGS. 1-4 show a preferred embodiment of the invention.
FIGS. 1 and 2 describe a preferred device of the invention, which shows a particle application opening with two sealing gaps (08) and one discharge gap (07) as well as two coating blades (06). The gap adjusting element (09) is moved in the direction (10), thereby adjusting the gap sizes and the gap diameters, respectively. The coating blades (06) are mounted by means of coating blade supports (05). The joint (02) allows swiveling of the unit consisting of the silo with silo walls (04) and the particle application opening.

FIG. 2 shows a detail depicting exchangeable coating blades (11).

FIGS. 1 and 2 describe, in one aspect, a silo (recoater particulate material reservoir) for receiving the particulate material to be processed, said silo being suspended from a coater support by a joint, preferably a solid-body joint, in a pendular manner, preferably using clamping elements for this purpose. At the lower end of the silo, two coating blade supports extending transverse to the coating direction, each with one coating blade, as well as a perpendicularly displaceable gap adjusting element are mounted, such that the two blades are diametrally opposed and form a perpendicular discharge gap, and the centre plane of said discharge gap is preferably located exactly below the joint, and the gap adjusting element is centrally located above both coating blades, and the gap adjusting element is larger in its dimension in the coating direction than the discharge gap, and the gap adjusting element thus forms a horizontal sealing gap with each of the two coating blades, which sealing gap can be dimensioned by vertically displacing the gap adjusting element. The silo can be stimulated to perform a pendular oscillation about the joint. The coating blade supports and the blades are embodied such that the coating blades can be changed in order to adjust the angle between the blade underside and the construction field. The angle thus created can assume positive and negative values for each blade. The values of the angle are +/−0 to 5°. Otherwise, in order to adjust the angle between the blade underside and the construction field, the entire system is tilted by the corresponding angle. See FIGS. 3 and 4 in this respect.

When changing the coating direction, the entire system is accordingly tilted in the other direction. The tilting is preferably carried out automatically using actuators. The axis of rotation of the tilting movement is preferably the imaginary axis formed by the overlap of the discharge gap centre plane and the blade underside.

Figure 3:
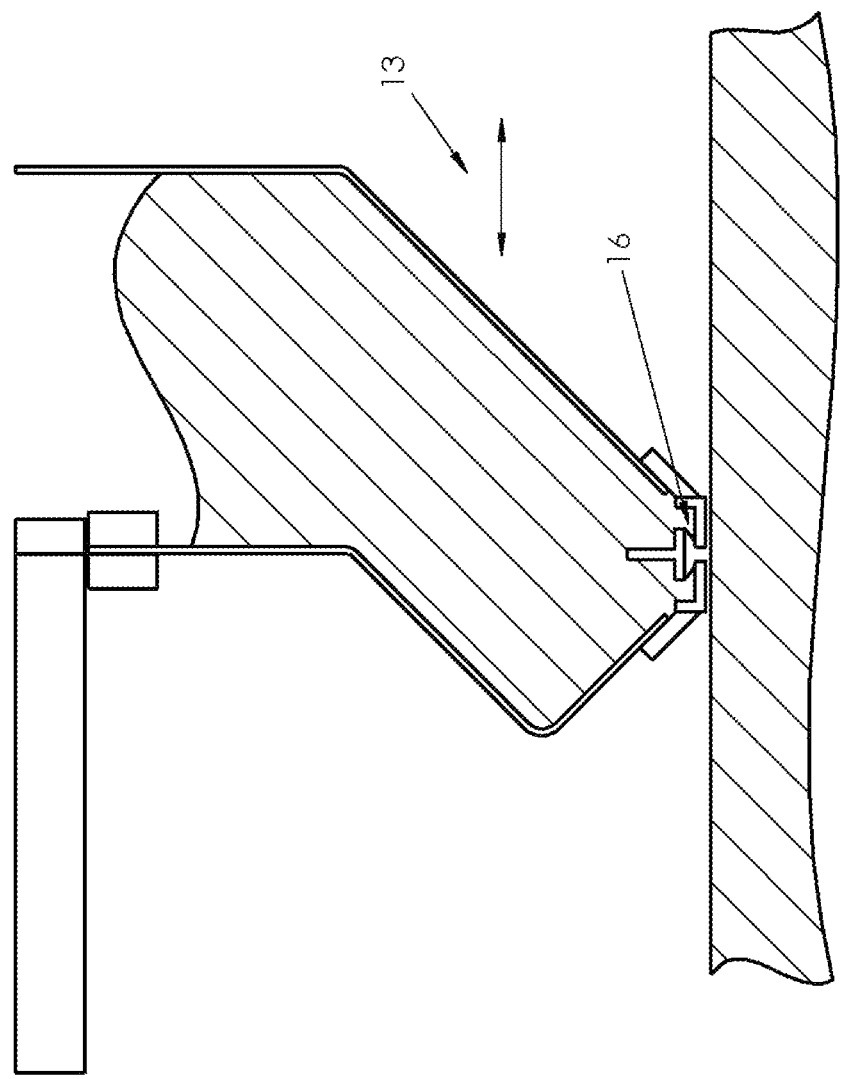
FIG. 3 is a cross-sectional view showing features of a recoater on a construction field.
Figure 4:
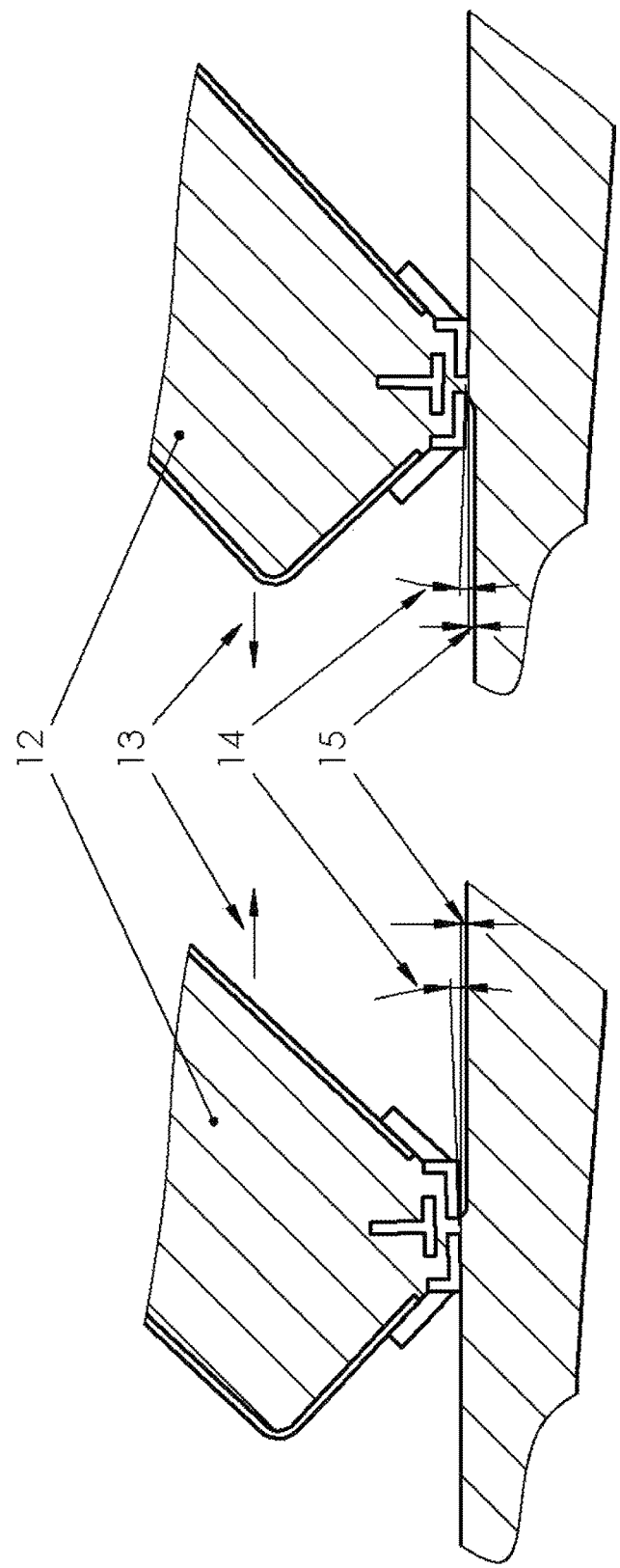
FIG. 4 is a cross-sectional view showing features of a recoater that coasts in two directions.

FIGS. 3 and 4 show the function of this preferred embodiment of the invention, wherein coating is carried out in two directions of movement, i.e. particulate material is applied onto the construction field in one direction and an opposite direction.

If the silo is not stimulated to oscillate, the particulate material to be processed forms its natural angle of repose between the gap adjusting element and each blade. In this case, the sealing gaps are adjusted such that the particulate material, due to its angle of repose, does not flow into the discharge gap and, thus, remains in the silo. In this state, the coater can be moved within the machine without discharging particulate material.

If the silo is stimulated to oscillate, the resulting energy input reduces the natural angle of repose of the particulate material. The particulate material thereby flows through the discharge gap and onto the construction field, while the coater is moved over the construction field, and the blade following the discharge gap spreads and smoothes the discharged particulate material. If the coating blades are not exchangeable for the purpose of angle adjustment between the blade underside and the construction field, the angle is adjusted by tilting the entire system. For example, the angle is adjusted to a value of 3°.

When changing the coating direction, the entire system is accordingly tilted in the other direction, which is preferably done automatically using actuators.

FIG. 4 shows a device corresponding to FIG. 1, which is movable in the direction (13) and can apply particulate material in both directions. In this case, the layer thickness (15) of the particulate material applied is shown as well as the blade angles (14) which can be adjusted in accordance with the direction of movement of the coater by tilting the coater.

FIGS. 5 to 8 show a further preferred embodiment of the invention.

Figure 5:
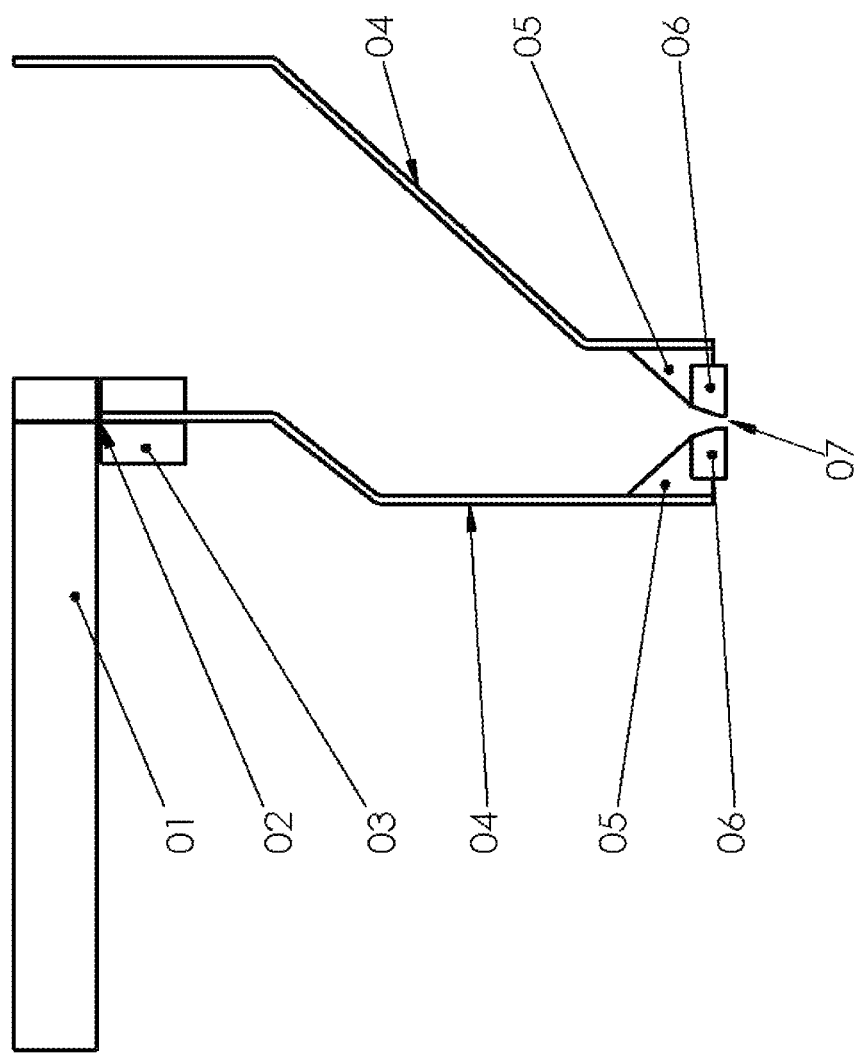
FIG. 5 is a cross-sectional view showing features of a recoater having a particle application opening with one discharge gap, two coating blades, and two coating blades supports.

FIGS. 5 and 6 describe a preferred device of the invention, showing a particle application opening which consists of a discharge gap (07), two coating blades (06) and two coating blade supports (05). The other components are mostly embodied in accordance with FIG. 1.

FIG. 6 shows in detail the mobility of the silo wall (04) in the direction (22), thereby allowing the discharge gap (07) to be adjusted in width. The exchangeable coating blades (11) as well as the different blade angles (14) achievable thereby are also evident.

FIGS. 5 and 6 describe a silo for receiving the particulate material to be processed, said silo being suspended from a coater support by a joint, preferably a solid-body joint, in a pendular manner, preferably using clamping elements for this purpose. At the lower end of the silo, two coating blade supports extending transverse to the coating direction, each with one coating blade, are mounted such that the two blades are diametrally opposed and form a perpendicular discharge gap, and the centre plane of said discharge gap is preferably located exactly below the joint, and the silo wall which is suspended in a non-pendular manner is supported so as to be displaceable along with the coating blade support and coating blade in the coating direction towards the other silo wall with its coating blade support and coating blade, thus allowing adjustment of the discharge gap size. The silo can be stimulated to perform a pendular oscillation about the joint. The coating blade supports and the blades may be embodied such that the coating blades can be changed in order to adjust the angle between the blade underside and the construction field. The resulting angle can assume both positive and negative values for each blade and is adjusted to 5° in the example. In a variant, in order to adjust the angle between the blade underside and the construction field, the entire system is tilted by the corresponding angle. See also FIGS. 7 and 8 in this respect.

Figure 7:
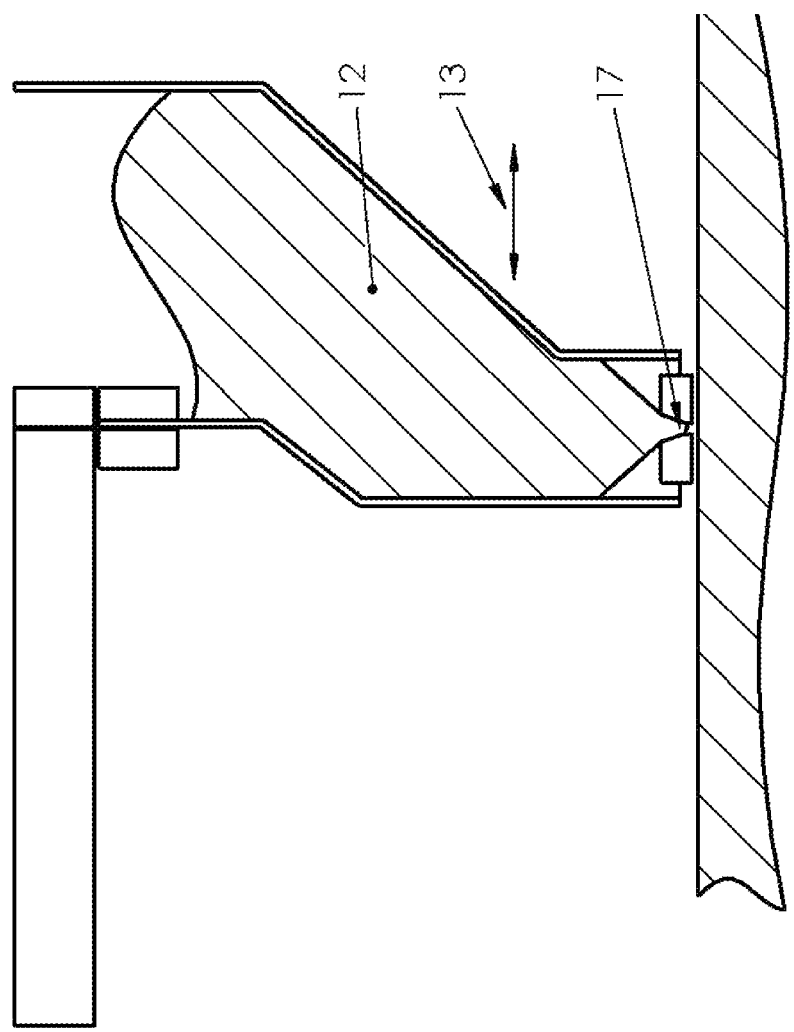
FIG. 7 is a cross-sectional view showing features of a recoater on a construction field.
Figure 8:
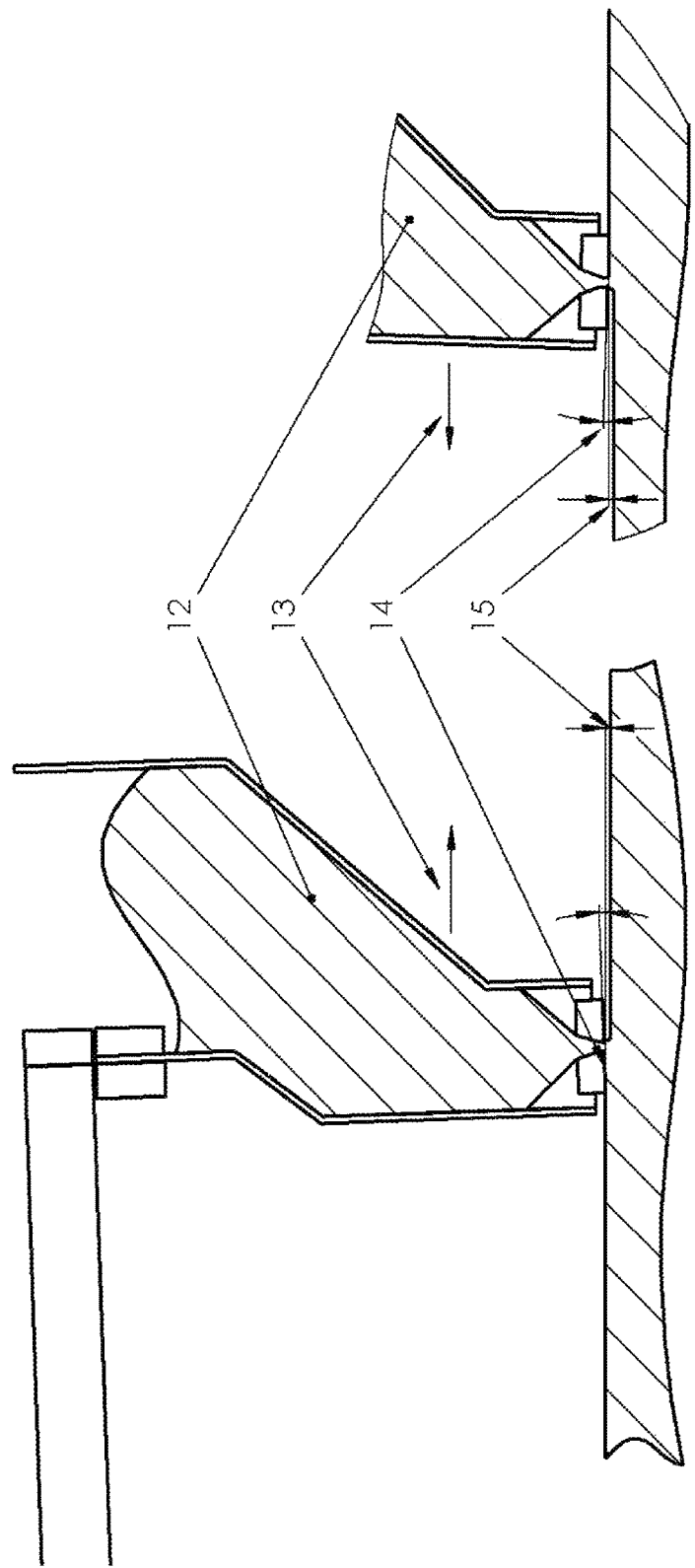
FIG. 8 is a cross-sectional view showing features of a recoater moving in one direction and an opposite direction.

FIGS. 7 and 8 show the function of this preferred embodiment of the invention, wherein coating is carried out in two directions of movement, i.e. particulate material is applied onto the construction field in one direction and an opposite direction.

If the silo is not stimulated to oscillate, the particulate material to be processed—due to the geometry of the particles and/or due to forces of cohesion and adhesion which may—result from the possible addition of further substances to the particulate material forms bridges in the perpendicular discharge gap, provided the gap size is adjusted according to the particulate material used.

The bridges make any particles located in the discharge gap stay in the discharge gap, thus preventing any discharge of particulate material from the silo. In this state, the coater can be moved within the machine without discharging particulate material.

If the silo is stimulated to oscillate, the energy introduced thereby breaks up the particulate material bridges formed in the discharge gap. The particulate material thereby flows through the discharge gap and onto the construction field and the coater is moved over the construction field, with the blade following the discharge gap spreading and smoothing the particulate material being discharged. The angle of the coating blade with respect to the construction field is adjusted by tilting the entire system and is, for example, 2°.

FIGS. 9 to 12 show a further preferred embodiment of the invention.

Figure 9:
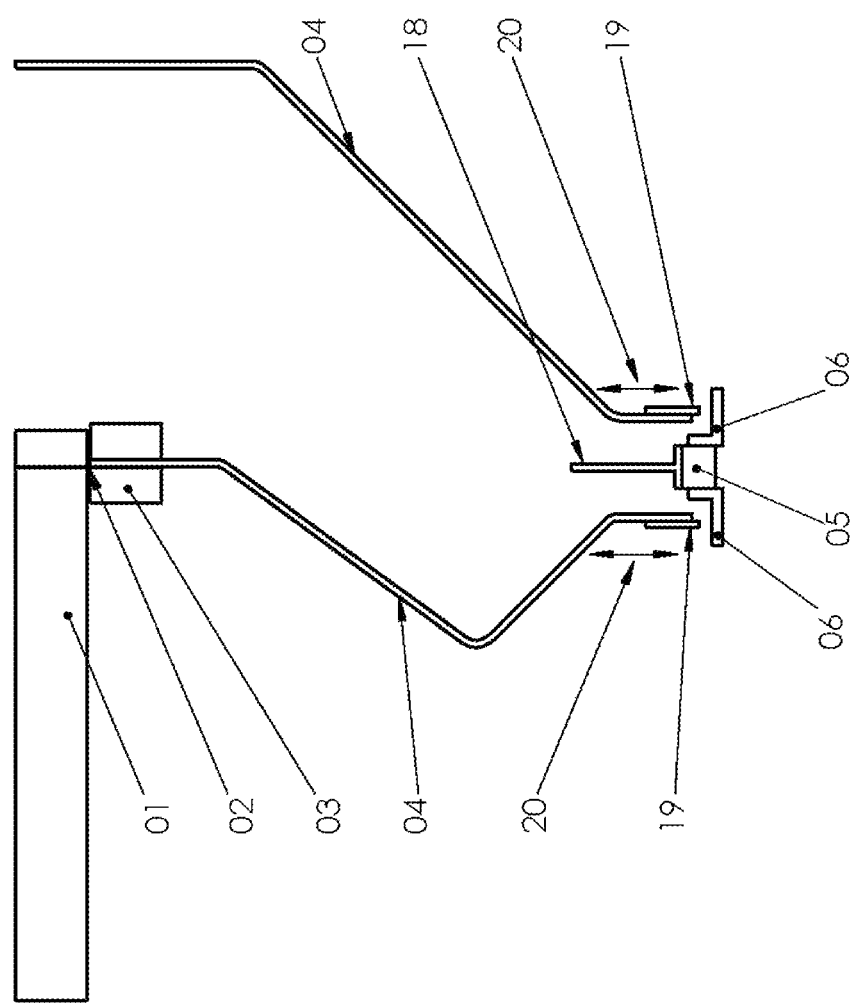
FIG. 9 is a cross-sectional view showing features of a recoater having two particle application openings. The recoater may have two recoating blades held by a coating blade support. A discharge gap may be adjusted by a gap adjusting slider.
Figure 10:
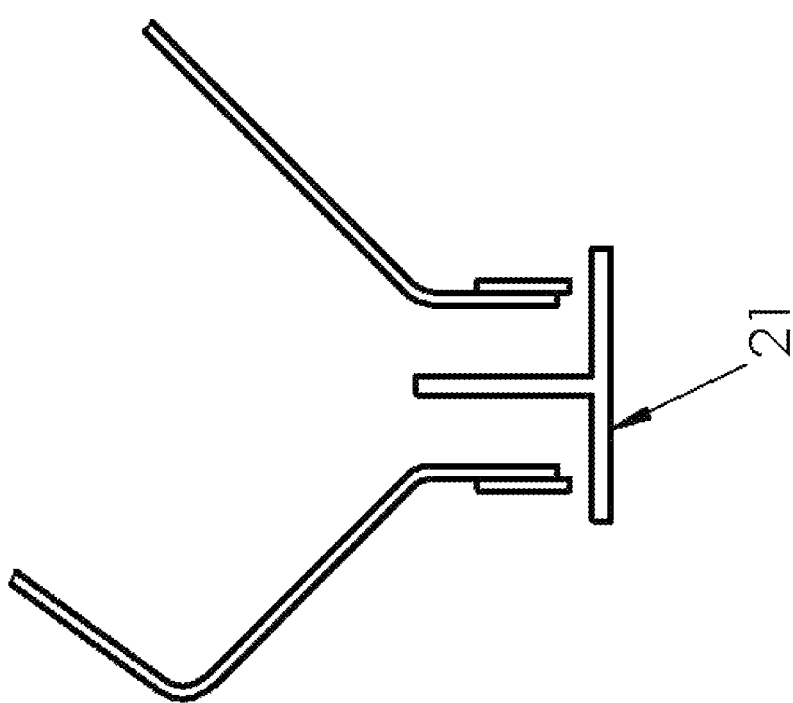
FIG. 10 is a cross-sectional view showing features of a recoater of FIG. 9 where the two recoating blades and coating blade support are replaced by a single component.

FIGS. 9 and 10 describe a preferred device of the invention which comprises two particle application openings and wherein the two coating blades (06) are held by means of a coating blade support (05) and the diameter of the discharge gap is adjustable by means of gap adjusting sliders (19) in the direction (20). Moreover, this embodiment shows the stiffening element 18.

In the detailed view of FIG. 10, the blade system is made of a component (21) which is correspondingly exchangeable in FIG. 9.

FIGS. 9 and 10 describe a preferred embodiment of the invention, wherein a coating blade unit, consisting of one or more coating blade supports with or without stiffening elements and two coating blades, as well as two perpendicularly displaceable gap adjusting sliders are mounted to the lower end of the silo, transverse to the coating direction. Both blades are arranged on both sides of the coating blade support and symmetrically to the latter, and the plane of symmetry of this arrangement is preferably located exactly below the joint and in alignment with the latter, and the gap adjusting sliders are preferably also arranged symmetrically with respect to said plane of symmetry and are mounted above the coating blades. Thus, together with the coating blade located below it, one gap adjusting slider forms a horizontal sealing gap which can be dimensioned by perpendicular displacement of the gap adjusting slider. Preferably, the gap adjusting sliders can be automatically actuated, independently of each other, by actuators so as to close and open the sealing gaps. The coating blade unit may also be embodied to consist of one single component. The silo can be stimulated to perform a pendular oscillation about the joint. In order to adjust the angle between the blade underside and the construction field, the entire system may be tilted by the corresponding angle. When changing the coating direction, the entire system is accordingly tilted in the other direction.

Figure 11:
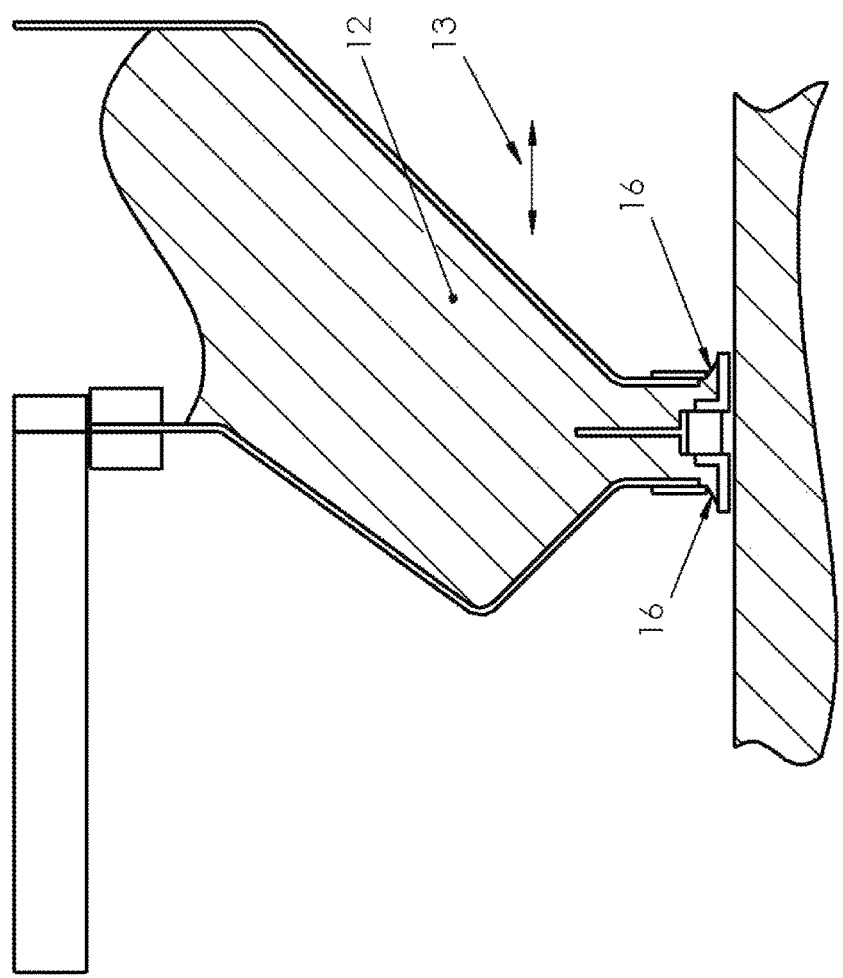
FIG. 11 is a cross-sectional view showing features of a recoater having two particle application openings in a construction field.
Figure 12:
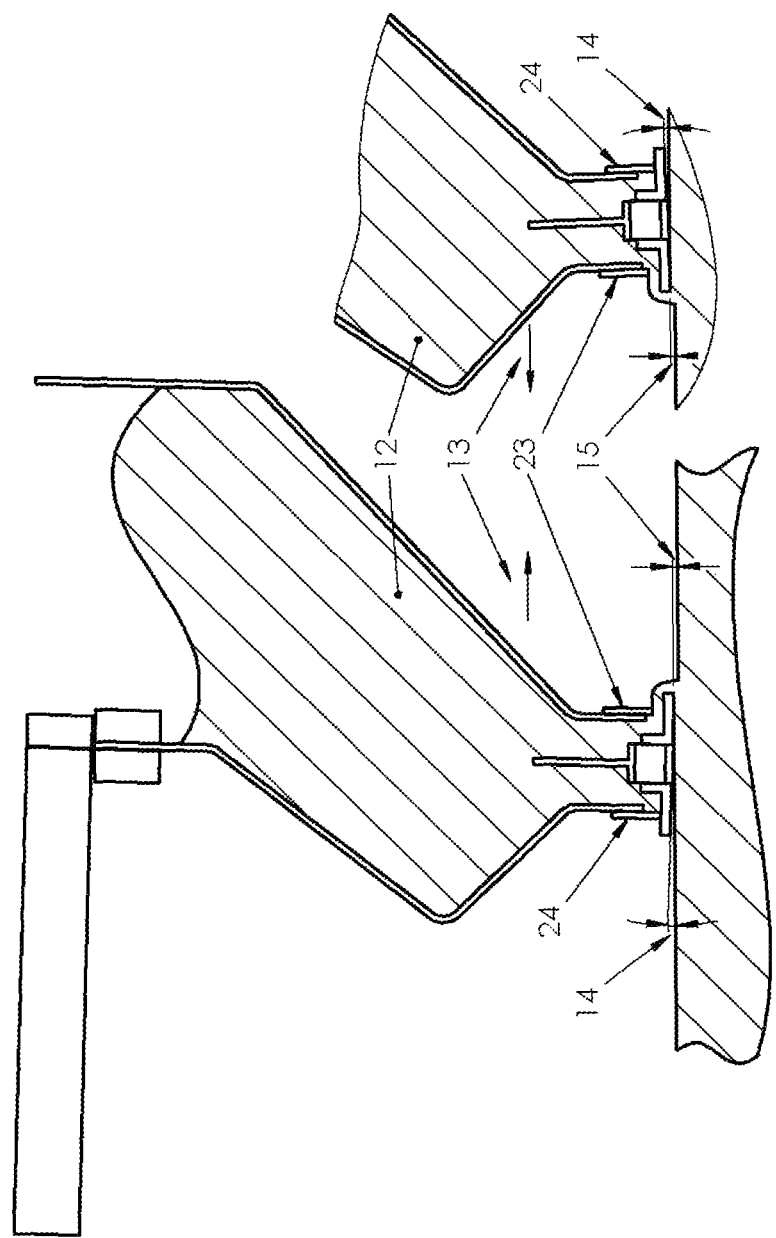
FIG. 12 is a cross-sectional view showing features of a recoater having two particle application openings moving in one direction and a opposite direction.

FIGS. 11 and 12 show the function of this preferred embodiment of the invention, wherein coating is carried out in two directions of movement, i.e. particulate material is applied onto the construction field in one direction and an opposite direction.

As in the other embodiments of the invention, the particle application onto the construction field is also achieved by an oscillating mechanism. When the oscillating mechanism is deactivated, no particulate material flows onto the construction field, because the particulate material forms its natural angle of repose in the sealing gaps.

If the silo is stimulated to oscillate, the resulting energy input reduces the natural angle of repose of the particulate material. In this condition, one gap adjusting slider is closed and the other is opened. This causes the particulate material to flow through the sealing gap on the side of the opened gap adjusting slider and onto the construction field, while the particulate material discharge from the opposite sealing gap is prevented by the closed gap adjusting slider. The coating blade under the gap spreads and smoothes the discharged particulate material. For adjustment of the angle between the blade underside and the construction field, the entire system is tilted about an axis of rotation and an angle of, for example, 4° is adjusted. In this case, the angle between the blade underside and the construction field can only assume values which ensure that the coating blade under the closed gap adjusting slider does not touch the construction field, so as to prevent it from affecting the particulate material layer just applied. When changing the coating direction, the opened gap adjusting slider is closed, the other gap adjusting slider is opened, and the entire system is accordingly tilted in the other direction.

FIG. 11 also shows the function of the discharge gap and sealing gap with a material cone seal (16). If no oscillation is generated, the particulate material forms a material cone at the coating blade, thus preventing any discharge of the particulate material (12) from the silo. If a vibration and, thus, an oscillation is generated, the natural angle of repose of the particulate material (12) decreases, allowing the latter to be applied onto the construction field.

FIG. 12 shows an opened gap adjusting slider (23) and a closed gap adjusting slider (24). Depending on the direction of movement, the respective gap is opened or closed, so that coating is performed in the respective direction.

FIGS. 13 to 16 show a further preferred embodiment of the invention.

Figure 13:
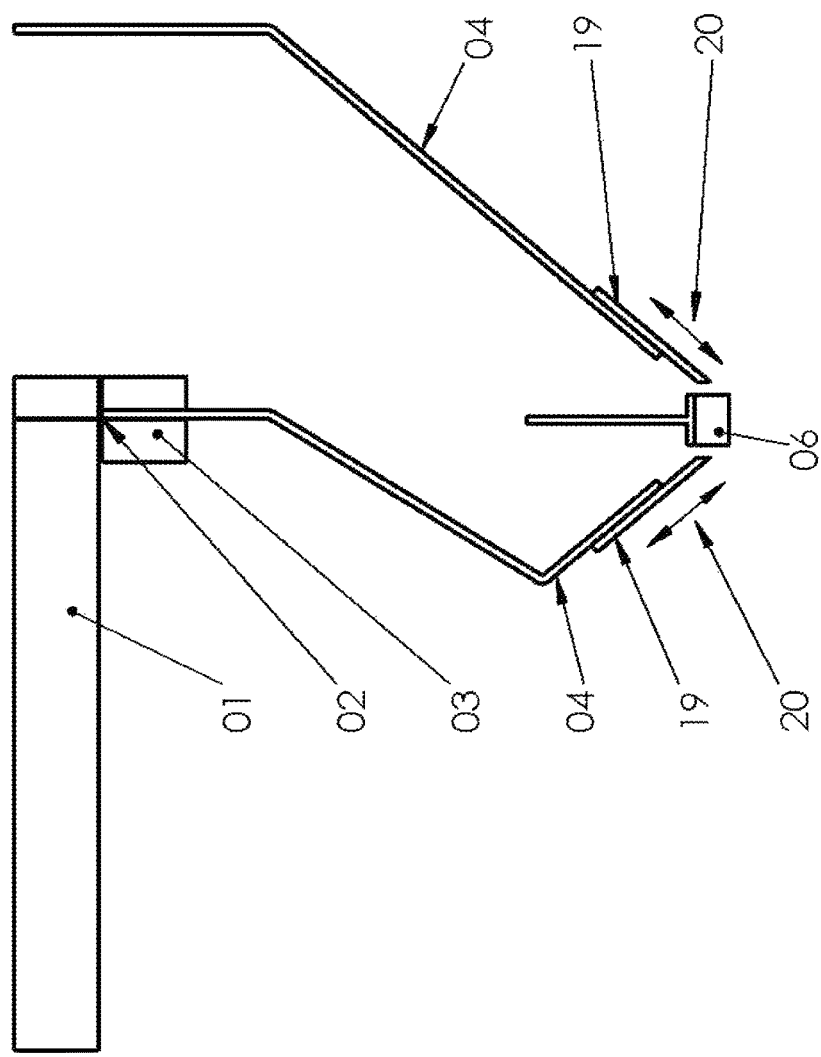
FIG. 13 is a cross-sectional view showing features of a recoater having a coating blade and two discharge gaps which are adjusted in diameter and/or size by means of tow gap adjusting sliders.
Figure 14:
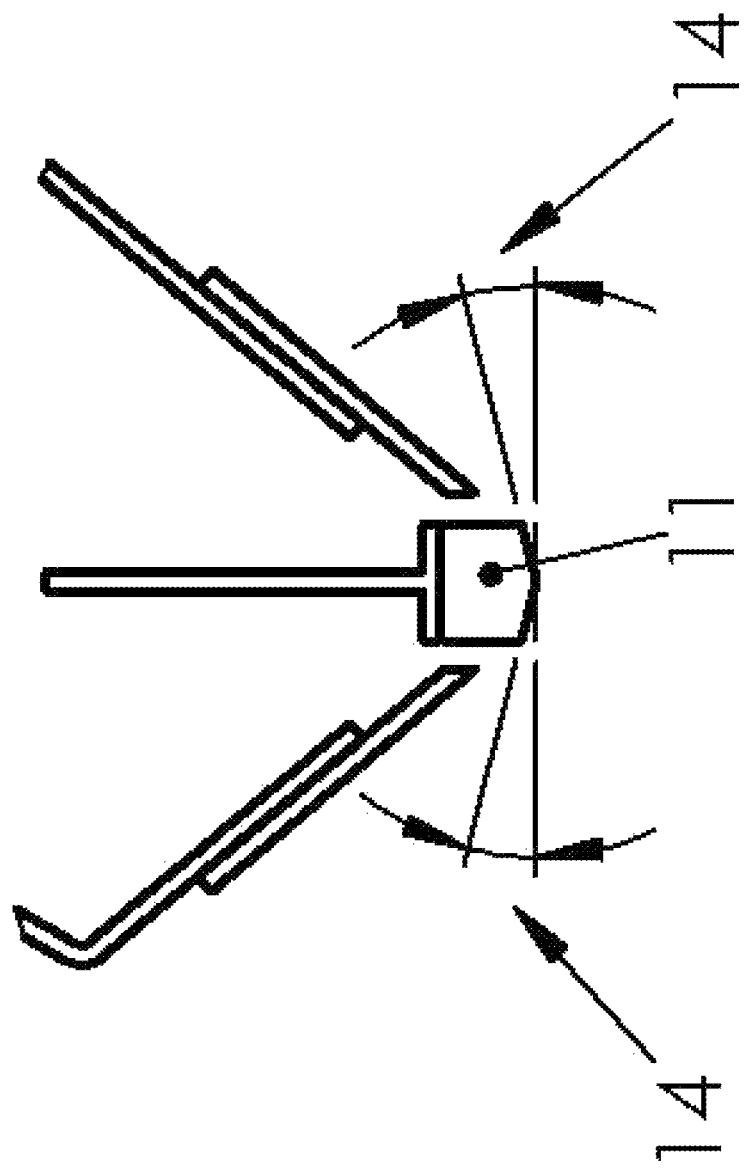
FIG. 14 is a cross-sectional view showing features of a recoater having a coating blade which changes angles.

FIGS. 13 and 14 describe a preferred device of the invention which comprises a coating blade (06) with two discharge gaps that can be adjusted in diameter/size by means of two gap adjusting sliders (19) in the adjusting direction (20).

In detail, FIG. 14 shows an exchangeable coating blade (11) and the respective blade angle (14) achievable thereby.

FIGS. 13 and 14 describe a preferred embodiment of the invention, wherein a coating blade unit, consisting of a coating blade, optionally with or without one or more coating blade supports with and optionally with or without one or more stiffening elements as well as two displaceable gap adjusting sliders, is mounted to the lower end of the silo, transverse to the coating direction. The centre plane of the blade is preferably located exactly below the joint and in alignment with the latter, and the gap adjusting sliders are preferably arranged symmetrically with respect to said centre plane of the blade, and the gap adjusting sliders are arranged such that they form a perpendicular discharge gap with one respective longitudinal side of the coating blade, which discharge gap can be dimensioned in size by displacing the respective gap adjusting slider, and the gap adjusting sliders can be actuated automatically and independently of each other using actuators to close and open the discharge gaps.

The silo can be stimulated to perform a pendular oscillation about the joint. The coating blade unit may also be embodied to consist of one single component. The coating blade unit may also be embodied such that the coating blade or the entire unit can be changed in order to adjust the angle between the blade underside and the construction field. The coating blade may be embodied such that the cross-section of the blade on the blade underside includes a cone whose apex is preferably located on the centre plane of the blade and, thus, below the joint. The angle enclosed by a conical surface of the coating blade underside with the construction field is then the coating blade angle, which preferably has the same value for both conical surfaces, e.g. 5°.

In order to adjust the angle between the blade underside and the construction field, the entire system may be optionally tilted by the corresponding angle. When changing the coating direction, the entire system is accordingly tilted in the other direction. If the blade underside is conical, the axis of rotation of the tilting movement is preferably parallel to the longitudinal side of the blade and extends exactly through the apex of the cone.

Figure 15:
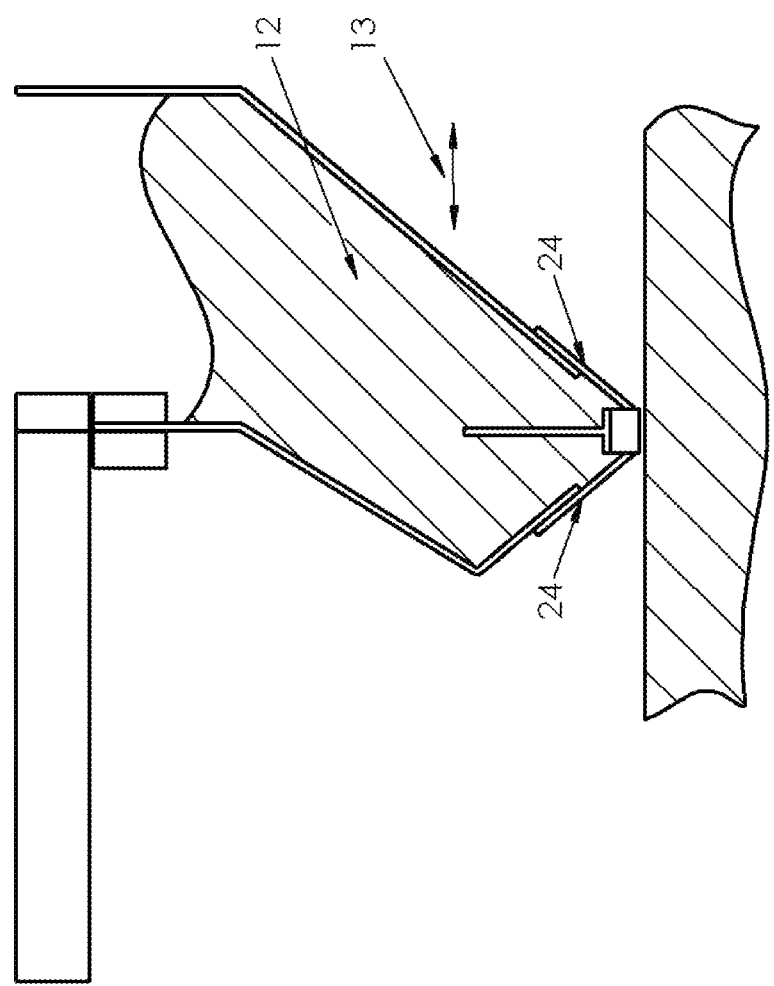
FIG. 15 is a cross-sectional view showing features of a recoater having two discharge gaps and two gap adjusting sliders in a construction field.
Figure 16:
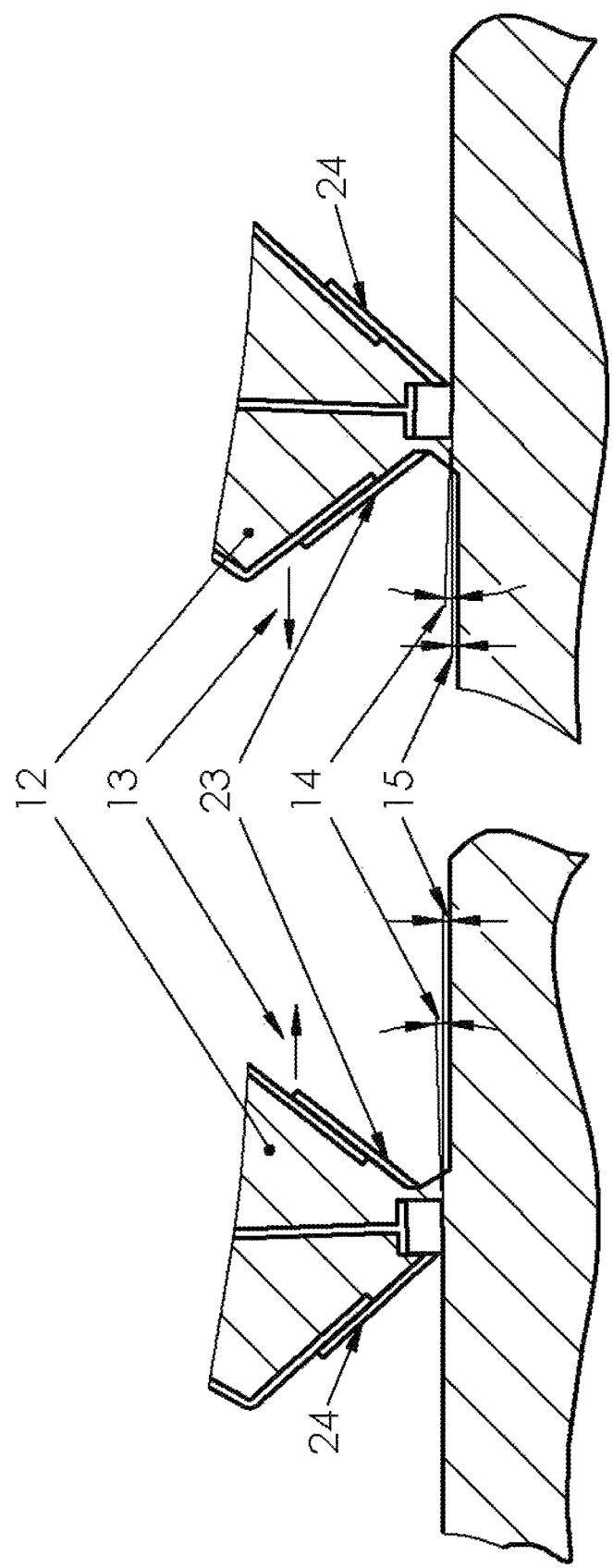
FIG. 16 is a cross-sectional view showing features of a recoater having two gap adjusting sliders moving in one direction and in an opposite direction.

FIGS. 15 and 16 show the function of this preferred embodiment of the invention, wherein coating is carried out in two directions of movement, i.e. particulate material is applied onto the construction field in one direction and an opposite direction.

The particulate material flows through the discharge gap and onto the construction field, while the particulate material discharge from the opposite discharge gap is prevented by the closed gap adjusting slider. The coater is moved over the construction field in the direction of the open discharge gap and the coating blade following the discharge gap spreads and smoothes the particulate material being discharged. The blade underside may be smooth or conical. If the blade underside is not conical and in order to adjust the angle between the blade underside and the construction field, the entire system may be tilted by the corresponding angle, i.e. by 3°. If the blade underside is conical, said tilting is optional. The axis of rotation is preferably the imaginary axis generated by the overlap of the centre plane of the blade and the blade underside; if the blade underside is conical, the axis of rotation of the tilting movement is preferably parallel to the longitudinal side of the blade and extends exactly through the apex of the cone.

In particular, FIG. 16 shows how the discharge gap respectively facing away from the direction of movement is closed by a gap adjusting slider (24). The gap adjusting slider (23) is opened, thus allowing particulate material (12) to be applied from the silo.

FIGS. 17 to 20 show a further preferred embodiment of the invention.

Figure 17:
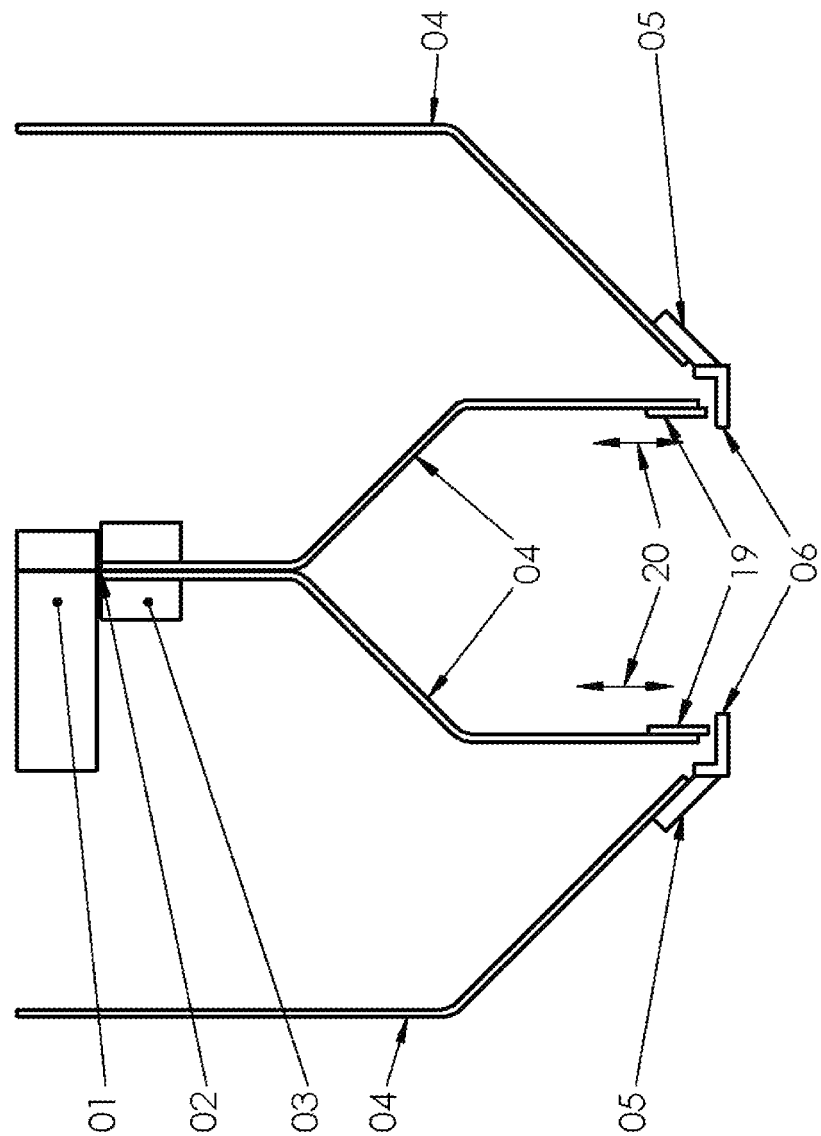
FIG. 17 is a cross-sectional view showing features of a recoater having two particle application openings and a silo with two chambers.

FIGS. 17 and 18 describe a preferred device of the invention which comprises two particle application openings, each respectively showing a coating blade (06) and a coating blade support (05) with a gap adjusting slider (19) displaceable in the direction (20), and also showing the blade angle (14) which can be achieved by means of exchangeable coating blades (11).

FIGS. 17 and 18 describe a silo for receiving the particulate material to be processed, said silo consisting of two chambers and being suspended from a coater support by a joint, preferably a solid-body joint, in a pendular manner. The chambers are arranged on both sides of the joint and are preferably symmetrical to each other, with the plane of symmetry preferably extending exactly through the joint perpendicularly. A coating blade unit, consisting of a coating blade support with or without stiffening elements and a coating blade, as well as a perpendicularly displaceable gap adjusting slider are mounted to the lower end of each silo chamber, transverse to the coating direction. In this case, both coating blade units are arranged at the same level and symmetrically to each other and the plane of symmetry of this arrangement is preferably located exactly below the joint and in alignment with the latter. The gap adjusting sliders are preferably also arranged symmetrically with respect to said plane of symmetry and are mounted above the coating blades. Thus, together with the coating blade located below it, a gap adjusting slider forms a horizontal sealing gap which can be dimensioned by perpendicular displacement of the gap adjusting slider, and the sealing gaps face each other. The gap adjusting sliders can be automatically actuated, independently of each other, by actuators to close and open the sealing gaps. The coating blade units may also be embodied such that the coating blade units or the coating blades can be exchanged in order to adjust the angle between the blade underside and the construction field. The angle adjustment is effected as described above.

Figure 19:
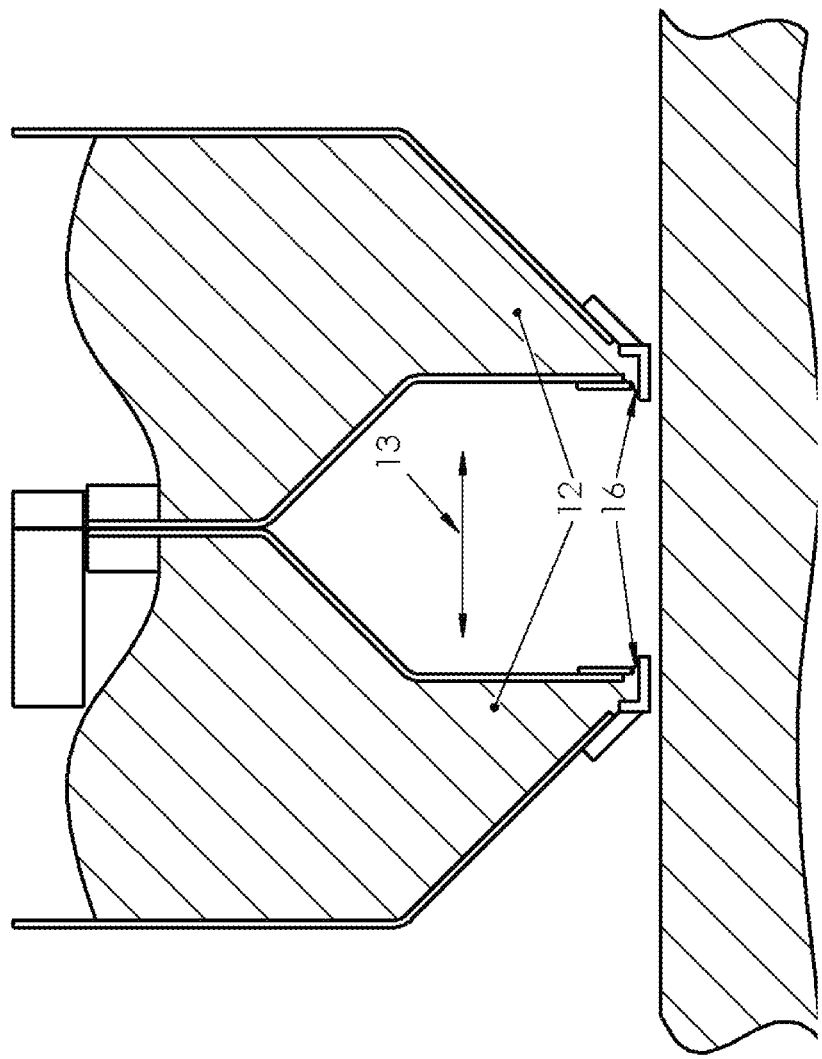
FIG. 19 is a cross-sectional view showing features of a recoater having a silo with two chambers in a construction field.
Figure 20:
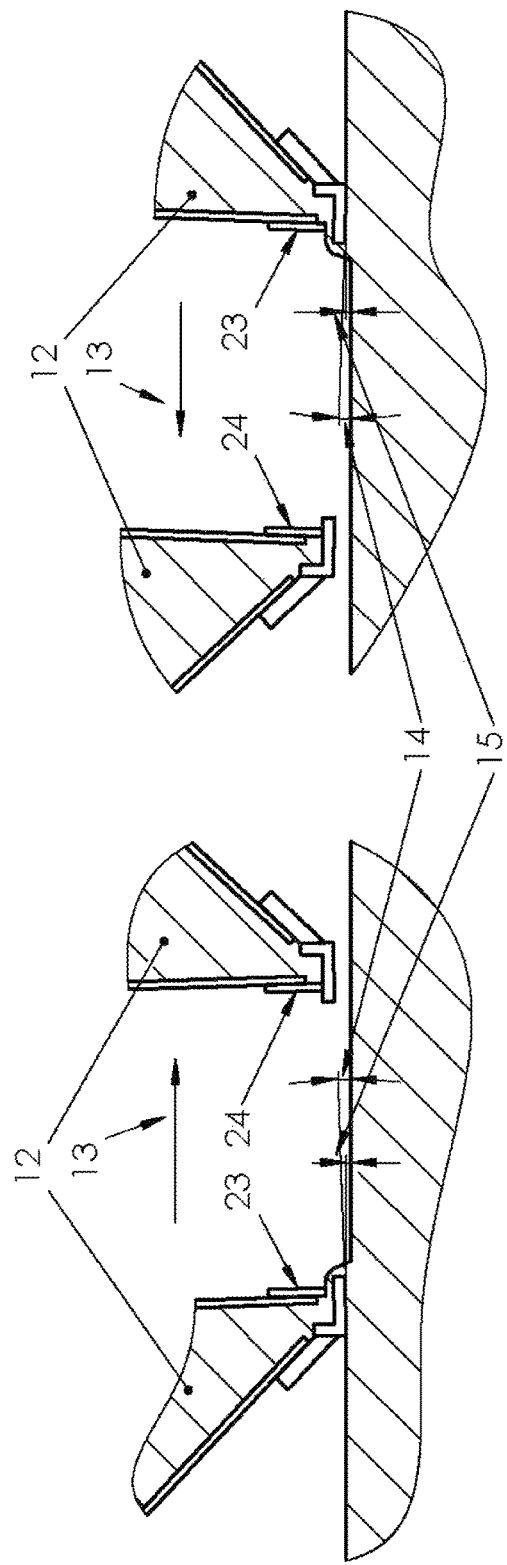
FIG. 20 is a cross-sectional view showing features of a recoater having a silo with two chambers moving in one direction and in an opposite direction.

FIGS. 19 and 20 show the function of this preferred embodiment of the invention, wherein coating is carried out in two directions of movement, i.e. particulate material is applied onto the construction field in one direction and an opposite direction.

If the silo is stimulated to oscillate, the resulting energy input reduces the natural angle of repose of the particulate material. In this condition, one gap adjusting slider is closed and the other is opened. The particulate material flows out of the chamber of the opened gap adjusting slider through the sealing gap and onto the construction field, while the particulate material discharge from the opposite chamber is prevented by the closed gap adjusting slider. At the same time, the coater is moved over the construction field in the direction of the open sealing gap, and the coating blade under the gap spreads and smoothes the discharged particulate material.

FIG. 20 shows how the gap adjustment sliders (23, 24) are opened and closed, respectively, according to the direction of movement and a corresponding layer thickness (15) is applied and the blade angle (14) is formed by tilting the unit.

FIGS. 21 to 24 show a further preferred embodiment of the invention.

Figure 21:
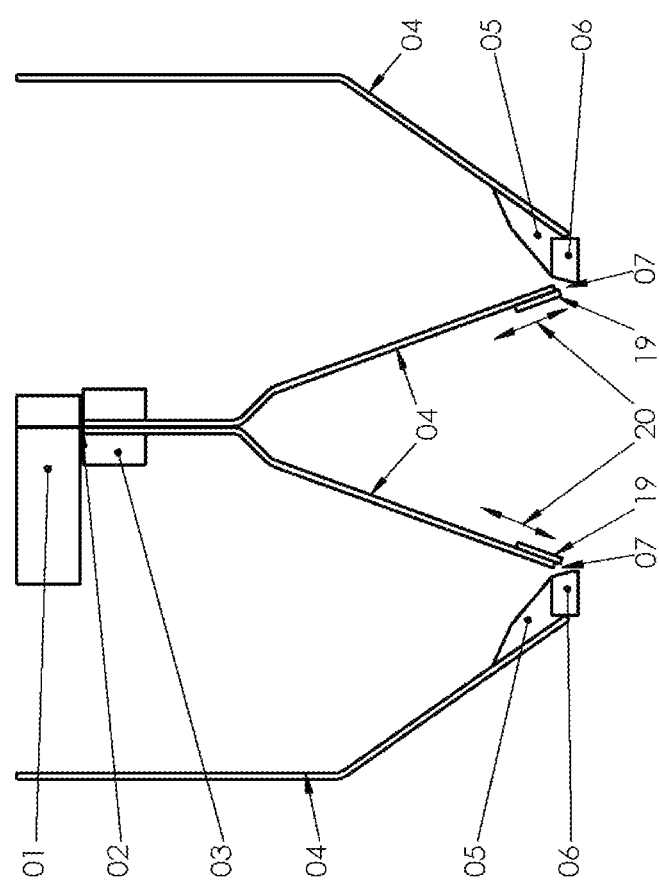
FIG. 21 is a cross-sectional view showing features of a recoater having a silo with two chambers.

FIGS. 21 and 22 describe a preferred device of the invention, which is a variation of the device of FIG. 17.

FIGS. 21 and 22 describe a silo for receiving the particulate material to be processed, said silo consisting of two chambers and being suspended from a coater support via a joint, preferably a solid-body joint, in a pendular manner. The chambers are arranged on both sides of the joint and are preferably symmetrical to each other, with the plane of symmetry preferably extending exactly through the joint perpendicularly. A coating blade unit, consisting of a coating blade support with or without stiffening elements and a coating blade, as well as a displaceable gap adjusting slider are mounted to the lower end of each silo chamber, transverse to the coating direction. In this case, both coating blade units are arranged at the same level and symmetrically to each other and the plane of symmetry of this arrangement is located exactly below the joint and in alignment with the latter. The gap adjusting sliders are also symmetric to said plane of symmetry and are arranged such that they form a perpendicular or almost perpendicular discharge gap with one respective longitudinal side of the coating blade, which discharge gap can be dimensioned in size by displacing the respective gap adjusting slider. The gap adjusting sliders can be automatically actuated, independently of each other, by actuators to close and open the discharge gaps. The sides of the two coating blades which form the discharge gaps together with the gap adjusting sliders face each other. The coating blade units may also be embodied such that the coating blade units or the coating blades can be exchanged in order to adjust the angle between the blade underside and the construction field. Further, the blade angle adjustment is effected as already described.

Figure 23:
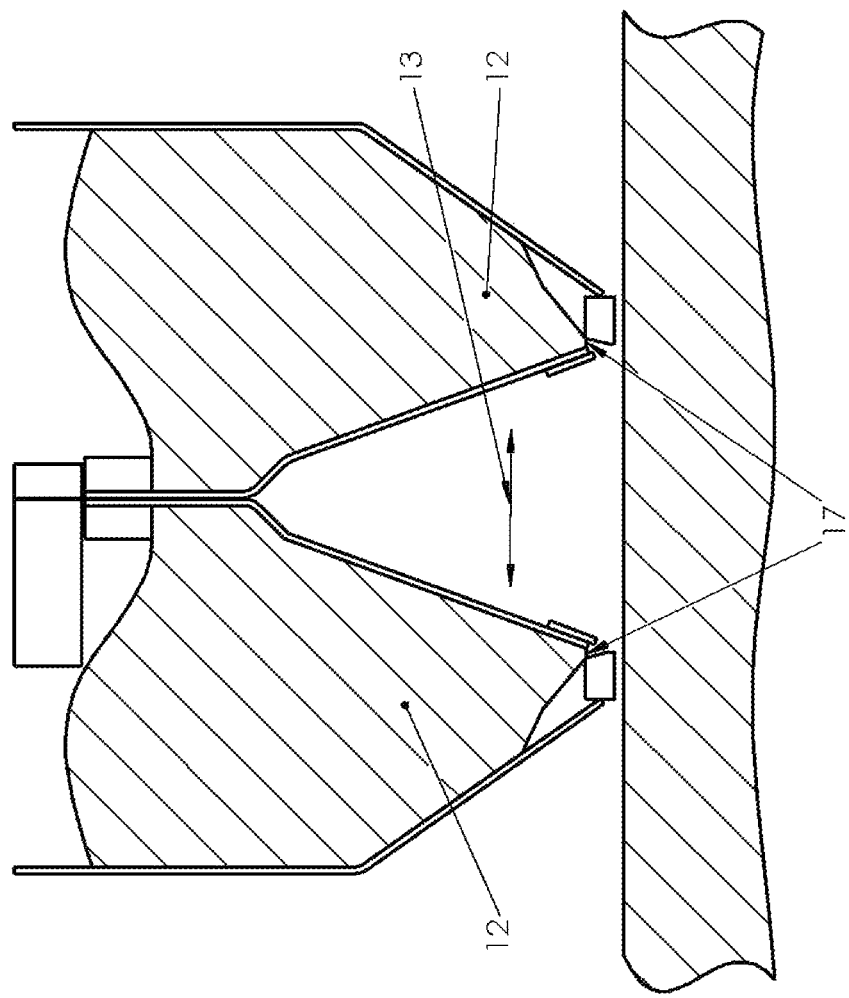
FIG. 23 is a cross-sectional view showing features of a recoater having a silo with two chambers in a construction field.
Figure 24:
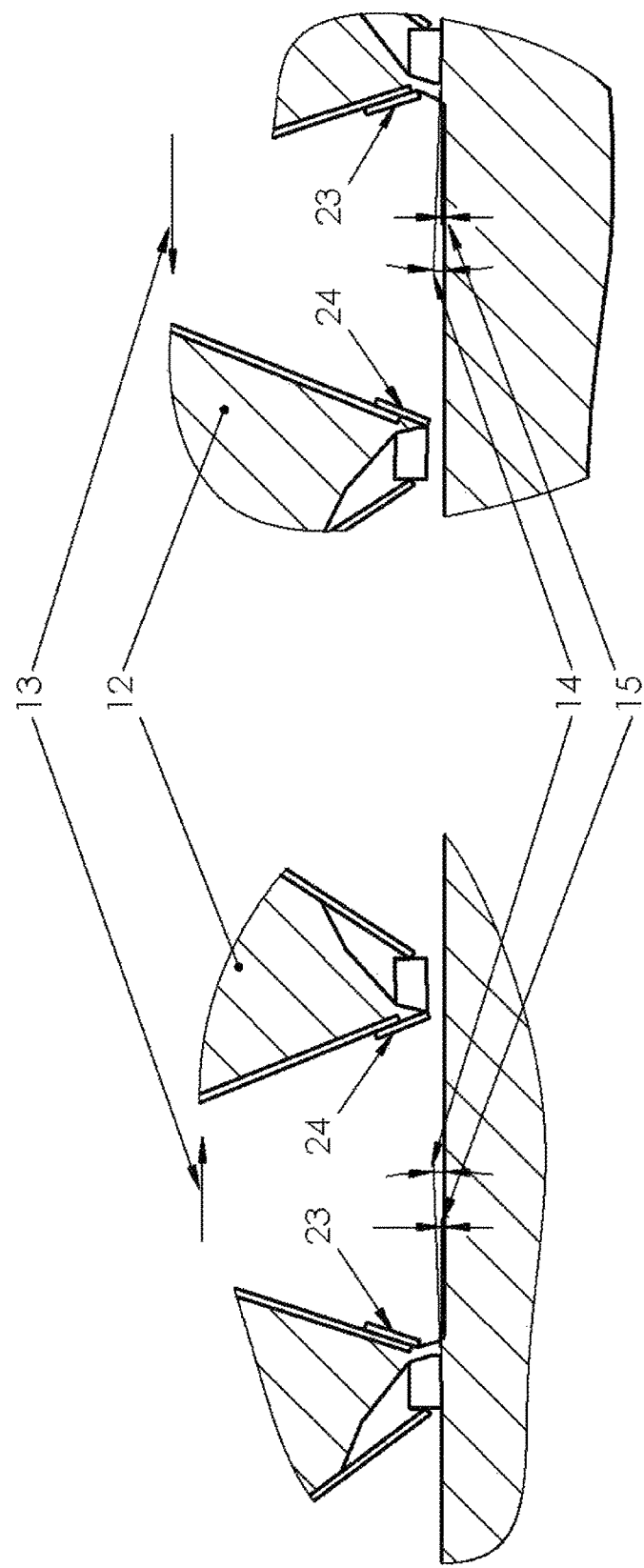
FIG. 24 is a cross-sectional view showing features of a recoater having a silo with two chambers in a construction field moving in one direction and in an opposite direction.

FIGS. 23 and 24 show the function of this preferred embodiment of the invention, wherein coating is carried out in two directions of movement, i.e. particulate material is applied onto the construction field in one direction and an opposite direction.

If the silo is stimulated to oscillate, the particulate material flows out of the chamber of the opened gap adjusting slider through the discharge gap and onto the construction field, while the particulate material discharge from the opposite chamber is prevented by the closed gap adjusting slider. At the same time, the coater is moved over the construction field such that the coating blade following the opened discharge gap spreads and smoothes the particulate material being discharged.

FIGS. 25 to 28 show a further preferred embodiment of the invention.

Figure 25:
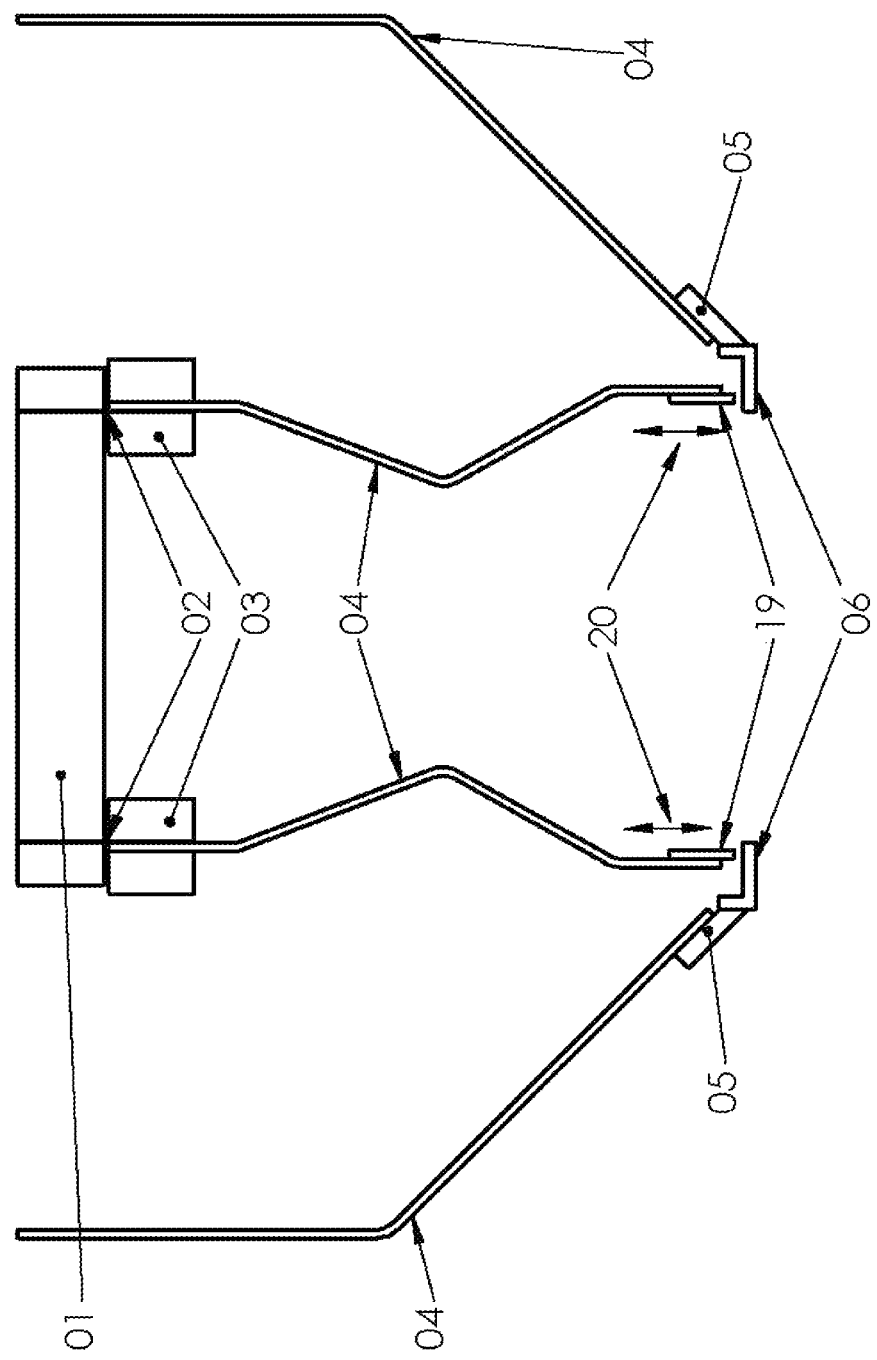
FIG. 25 is a cross-sectional view showing features of a recoater having two particle application openings and two coater blades.
Figure 26:
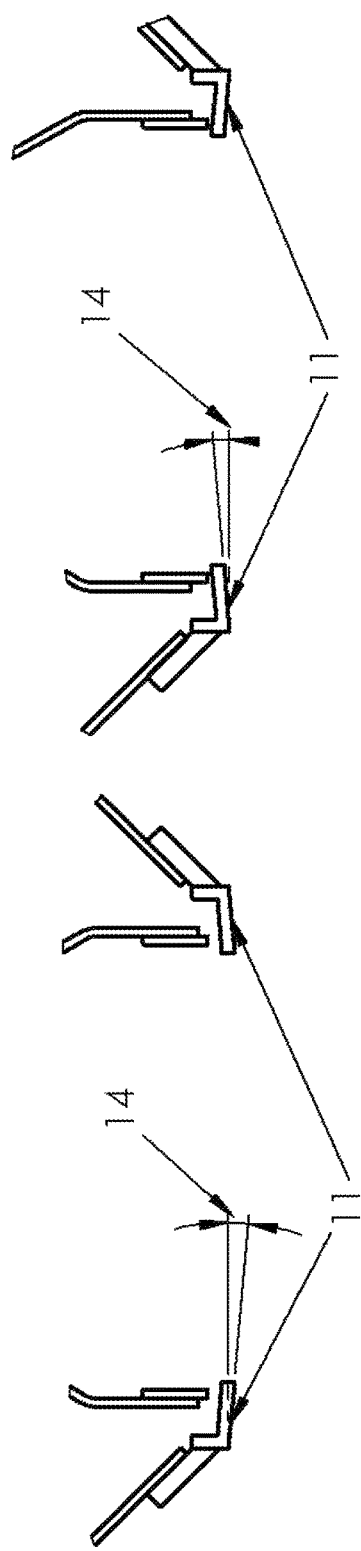
FIG. 26 is a cross-sectional view showing features of a recoater having two particle application openings and changes in the blade angles.

FIGS. 25 and 26 describe a preferred device of the invention, which is likewise a variation of the device of FIGS. 17 and 21 wherein, in particular, the orientation of the discharge gap is embodied in the horizontal or vertical direction and the other components have been adapted thereto accordingly.

FIGS. 25 and 26 describe two silos for receiving the particulate material to be processed, which are each suspended from a coater support by a joint, preferably a solid-body joint, in a pendular manner. The silos are preferably suspended symmetrically to each other from said coater support, with the plane of symmetry preferably being the centre plane of the coater support. A coating blade unit, consisting of a coating blade support with or without stiffening elements and a coating blade, as well as a perpendicularly displaceable gap adjusting slider are mounted to the lower end of each silo, transverse to the coating direction. In this case, both coating blade units are arranged at the same level and symmetrically to each other and the plane of symmetry of this arrangement is the centre plane of the coater support, wherein the gap adjusting sliders are preferably also arranged symmetrically to said plane of symmetry and are mounted above the coating blades. Together with the coating blade located below it, one gap adjusting slider forms a horizontal sealing gap which can be dimensioned by perpendicular displacement of the gap adjusting slider. The sealing gaps face each other, and the gap adjusting sliders can be automatically actuated, independently of each other, by actuators to close and open the sealing gaps. Each silo can be stimulated to perform a pendular oscillation about the joint to which it is mounted. In this case, the source of oscillation stimulation may be the same for both silos. Optionally, each silo may have its own source of oscillation stimulation. The angle adjustment is effected as already described.

Figure 27:
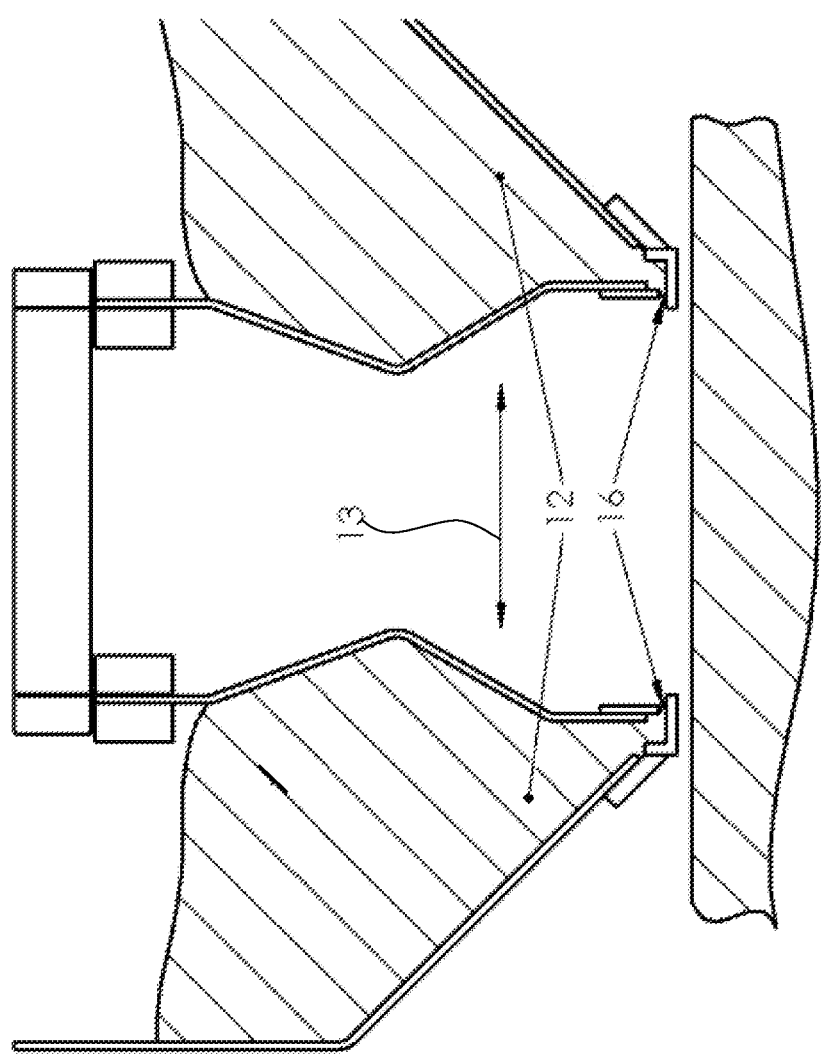
FIG. 27 is a cross-sectional view showing features of a recoater having two particle application openings in a construction field.
Figure 28:
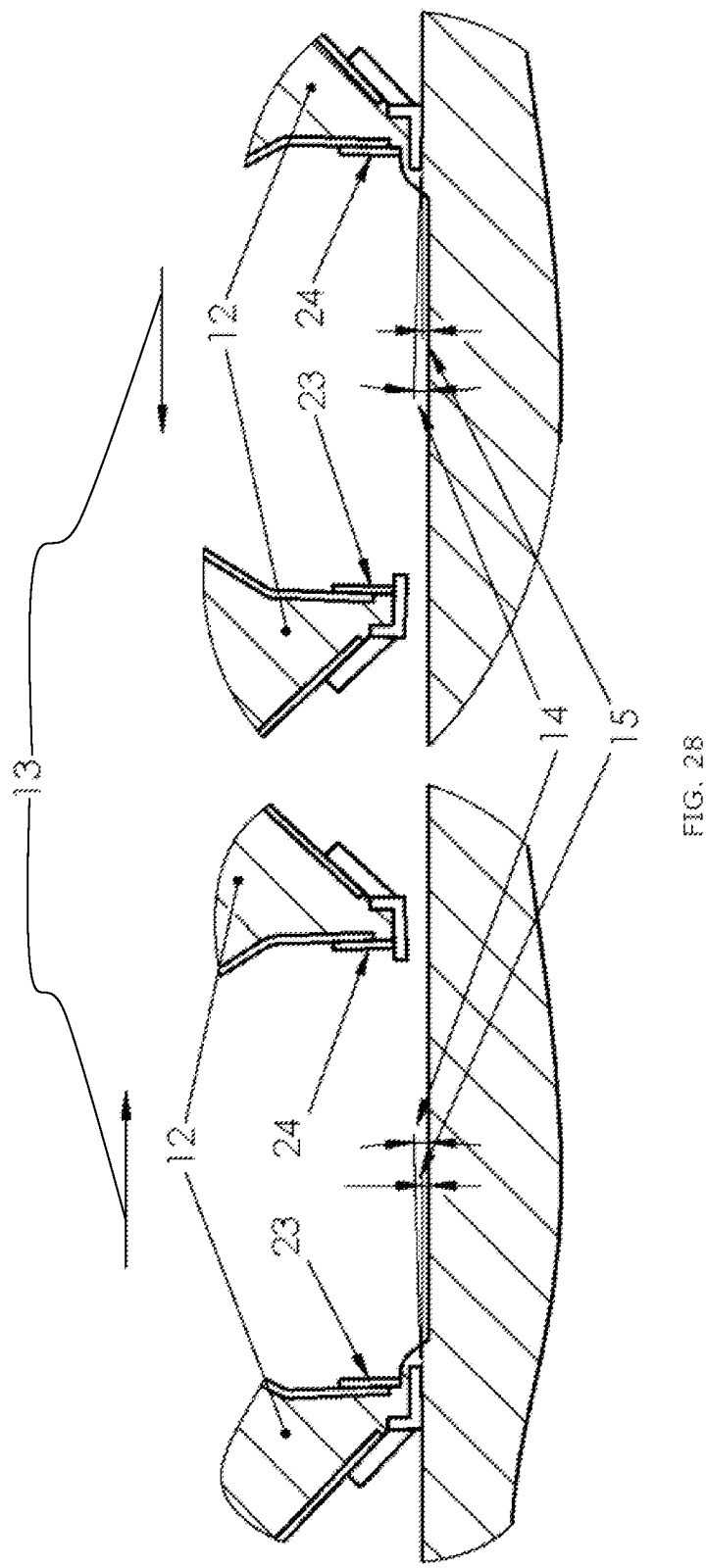
FIG. 28 is a cross-sectional view showing features of a recoater having two particle application openings moving in one direction and in an opposite direction.

FIGS. 27 and 28 show the function of this preferred embodiment of the invention, wherein coating is carried out in two directions of movement, i.e. particulate material is applied onto the construction field in one direction and an opposite direction.

If both silos are stimulated to oscillate by the same source, the gap adjusting slider of one silo is closed and that of the other silo is opened. If only one silo is stimulated by its own source of oscillation, the gap adjusting slider of this silo is opened, and the gap adjusting slider of the silo not stimulated may be either opened or closed. The particulate material flows out of the stimulated silo with the opened gap adjusting slider through the sealing gap and onto the construction field, while the particulate material discharge from the other silo is prevented either by the closed gap adjusting slider or by non-stimulation or both. At the same time, the coater is moved over the construction field in the direction of the open sealing gap, and the coating blade under the gap spreads and smoothes the discharged particulate material.

FIG. 27 in turn shows a cone seal (16) whose sealing effect can be neutralised by vibration and by generating an oscillation.

FIGS. 29 to 32 show a further preferred embodiment of the invention.

Figure 29:
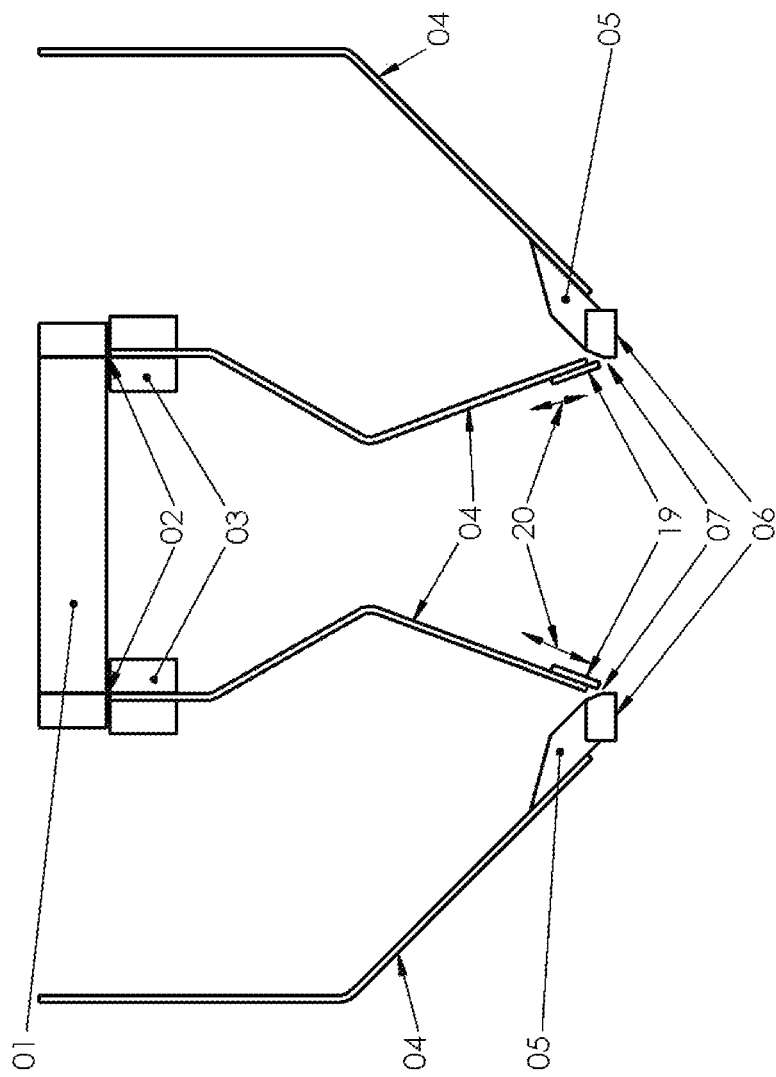
FIG. 29 is a cross-sectional view showing features of a recoater having two silos.

FIGS. 29 and 30 describe a preferred device of the invention, which is likewise a variation of the device of FIGS. 17, 21, and 25.

FIGS. 29 and 30 describe two silos for receiving the particulate material to be processed, which are each suspended from a coater support by a joint, preferably a solid-body joint, in a pendular manner. The silos are preferably suspended symmetrically to each other from said coater support, with the plane of symmetry preferably being the centre plane of the coater support. A coating blade unit, consisting of a coating blade support with or without stiffening elements and a coating blade, as well as a perpendicularly displaceable gap adjusting slider are mounted to the lower end of each silo, transverse to the coating direction. In this case, both coating blade units are arranged at the same level and symmetrically to each other. The plane of symmetry of this arrangement is preferably the centre plane of the coater support, and the gap adjusting sliders are preferably also arranged symmetrically with respect to said plane of symmetry. The gap adjusting sliders are arranged such that they form a perpendicular or almost perpendicular discharge gap with one respective longitudinal side of a coating blade, which discharge gap can be dimensioned in size by displacing the respective gap adjusting slider, and the gap adjusting sliders can be actuated automatically and independently of each other using actuators to close and open the discharge gaps. The sides of the two coating blades which form the discharge gaps together with the gap adjusting sliders face each other. The coating blade units may also be embodied such that the coating blade units or the coating blades can be exchanged in order to adjust the angle between the blade underside and the construction field. Each silo can be stimulated to perform a pendular oscillation about the joint to which it is mounted. In this case, the source of oscillation stimulation may be the same for both silos. Optionally, each silo may have its own source of oscillation stimulation. If the coating blade units are not exchangeable for adjustment of the blade angle, the entire system may be tilted by the corresponding angle in order to adjust the angle between the blade underside and the construction field. This is done as already described. When changing the coating direction, the entire system is accordingly tilted in the other direction.

Figure 31:
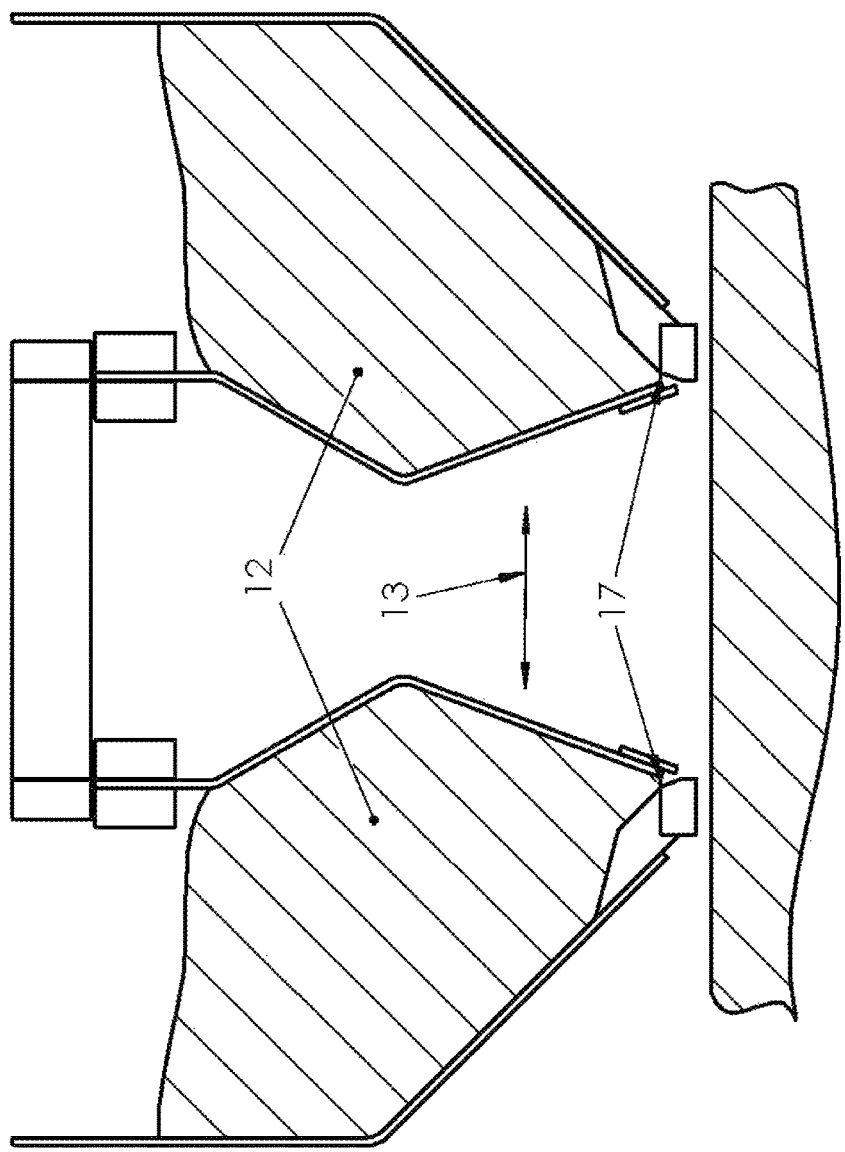
FIG. 31 is a cross-sectional view showing features of a recoater having two silos in a construction field.
Figure 32:
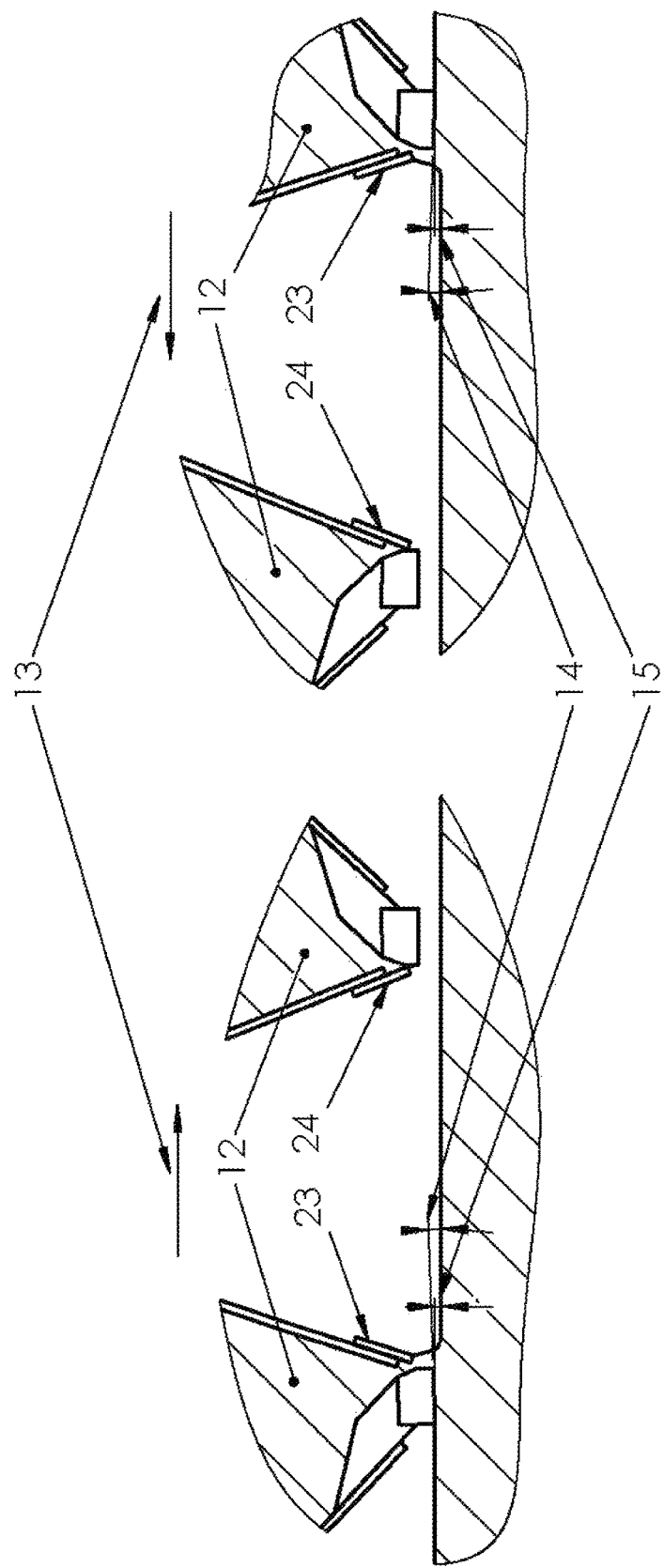
FIG. 32 is a cross-sectional view showing features of a recoater having two silos, moving in one direction and an opposite direction in a construction field.

FIGS. 31 and 32 show the function of this preferred embodiment of the invention, wherein coating is carried out in two directions of movement, i.e. particulate material is applied onto the construction field in one direction and an opposite direction.

If both silos are stimulated to oscillate by the same source, the gap adjusting slider of one silo is closed and that of the other silo is opened. If only one silo is stimulated by its own source of oscillation, the gap adjusting slider of this silo is opened, and the gap adjusting slider of the silo not stimulated may be either opened or closed. The particulate material flows out of the stimulated silo with the opened gap adjusting slider through the discharge gap and onto the construction field, while the particulate material discharge from the other silo is prevented either by the closed gap adjusting slider or by non-stimulation or both simultaneously. At the same time, the coater is moved over the construction field such that the coating blade following the discharge gap of the stimulated silo spreads and smoothes the particulate material being discharged. The angle adjustment is effected as already described. When changing the coating direction, either the opened gap adjusting slider is closed and the other gap adjusting slider is opened, or the silo not stimulated so far is stimulated to oscillate and the previously stimulated silo is no longer stimulated, or both, and the entire system is accordingly tilted in the other direction.

DETAILED DESCRIPTION OF THE INVENTION

According to the invention, an object underling the application is achieved by providing a device which comprises means allowing the application of particulate material in two directions without empty passages.

First of all, several terms according to the invention will be explained in more detail below.

A "3D moulded part", "moulded article" or "component" in the sense of the invention means all three-dimensional objects manufactured by means of the method according to the invention or/and the device according to the invention which exhibit dimensional stability.

"Construction space" is the geometric location where the particulate material bed grows during the construction process by repeated coating with particulate material or through which the bed passes when applying continuous principles. The construction space is generally bounded by a bottom, i.e. the construction platform, by walls and an open top surface, i.e. the construction plane. In continuous principles, there usually is a conveyor belt and limiting side walls. The construction space can also be designed in the form of what is called a job box, which constitutes a unit that can be moved in and out of the device and allows batch production, with one job box being moved out after completion of a process to allow a new job box to be moved into the device immediately, thereby increasing both the production volume and, consequently, the performance of the device.

The "particulate materials" or "particulate construction materials" or "construction materials" of use herein may be any materials known for powder-based 3D printing, in particular polymers, ceramics and metals. The particulate material is preferably a free-flowing powder when dry, but may also be a cohesive, cut-resistant powder or a particle-charged liquid. In this specification, particulate material and powder will be used synonymously.

The "particulate material application" is the process of generating a defined layer of powder. This may be done either on the construction platform or on an inclined plane relative to a conveyor belt in continuous principles. The particulate material application will also be referred to below as "coating" or "recoating".

"Selective liquid application" in the sense of the invention may be effected after each particulate material application or irregularly, depending on the requirements for the moulded article and for optimisation of the moulded article production, e.g. several times with respect to particulate material application. In this case, a sectional image of the desired article is printed.

The "device" used for carrying out the method according to the invention may be any known 3D-printing device which includes the required parts. Common components include coater, construction field, means for moving the construction field or other components in continuous processes, metering devices and heating and irradiating means and other components which are known to the person skilled in the art and will therefore not be described in detail herein.

The construction material is always applied in a "defined layer" or "layer thickness", which is individually adjusted according to the construction material and the process conditions. It is, for example, 0.05 to 0.5 mm, preferably 0.1 to 0.3 mm.

The "tilting" of the silo means the rotation of the coater unit or of the coater towards the direction of movement so as to lift the inactive coating blade (06) in such a manner that it does not contact the construction field (26), while at the same time establishing the correct angle between the active coating blade and the construction field. Thus, the tilting is also effected cyclically in coordination with the change in the direction of movement.

"Angle adjustment" in the sense of the invention is the adjustment of the angle between the construction field and either of the two coating blades. In this context, an angle of −5° to +5°, preferably −3° to +3°, more preferably −1° to +1°, may be adjusted.

"Coater" or "recoater" means the unit by means of which the particulate material is applied onto the construction field. The unit may consist of a particulate material reservoir and a particulate material application unit wherein, according to the invention, the particulate material application unit comprises a particle application opening and a coating blade.

An "oscillating blade" or "coating blade" in the sense of the invention is that component which levels the applied particulate material.

A "particle application opening" in the sense of the invention is the opening by means of which the particulate material is applied onto the construction field and which is configured such, in the sense of the invention, that the coater can apply particulate material onto the construction field in two opposite directions. The "particle application opening" comprises at least one discharge gap and one or two sealing gaps or two discharge gaps and two sealing gaps. The "particle application opening" can form a unit with one or two particulate material silos.

A "discharge gap" in the sense of the invention is the special opening which is in direct contact with the construction field and which discharges the particulate material onto the construction field.

A "sealing gap" in the sense of the invention is an opening in which the particulate material is prevented from flowing out of the silo by a material cone or bridges formed therein. In some embodiments of the invention, the sealing gap may be closed and opened in a selective and controlled manner so as to stop or start the particle flow. A sealing gap may be a discharge gap at the same time.

A "gap adjusting element" or "actuator" in the sense of the invention is a means of controlling the diameter of the sealing gap and the discharge gap.

Known "print heads" with suitable technology are used to apply the printing liquid. The liquid may be selectively applied by means of one or more print heads. Preferably, the print head or print heads are adjustable in terms of drop mass. The print head or print heads may selectively apply the liquid in one or both directions of movement. The method achieves that the particulate construction material is selectively solidified, preferably selectively solidified and sintered.

In the construction process, the particulate material and the printing liquid are cyclically applied. For this purpose, the construction field is lowered by the desired layer thickness or the application units are raised correspondingly. These operations are cyclically repeated.

The aspects of the invention will be described in more detail below.

In one aspect, the invention relates to a method for producing 3D moulded parts, wherein the particulate material is applied in two opposite directions of movement. With the method according to the invention, the above-described problems or disadvantages of the prior art are at least reduced or even avoided completely.

Another aspect of the invention is a device which is suitable to carry out a method according to the invention. Preferably, the device is characterised by one or two coating blades and one or two particle application openings, which preferably do not have a seal and can apply particulate material onto the construction field in at least two directions of movement without empty passages.

With the method according to the invention and the device according to the invention, a particularly advantageous solution has been found to produce moulded parts in a time-saving and economically very advantageous manner. The construction of the device according to the invention has allowed the number of empty passages to be reduced or even to avoid empty passages completely. Thus, the invention has made it possible not only to print selectively in several directions, but also to enable two-dimensional coating with the particulate material. As a result, it is now possible for both the coater and the print heads to apply particulate material or printing liquid, respectively, in several directions. This allows the process steps to be carried out in parallel, thus increasing the efficiency of the method by 100% and more. Advantages are thus achieved in many regards. In particular, the volume output per unit of time is significantly increased by the device and method according to the invention.

In another aspect, the invention relates to moulded parts, produced by a method or/and a device according to the invention.

The object underlying the invention is achieved by a method of producing 3D moulded parts by means of a layer application technique, wherein a coater (recoater) (25) is used comprising two coating blades (06) and a particle application opening, preferably one or two discharge gaps (07) and one or two sealing gaps (08), or comprising two coating blades (06) and two particle application openings, preferably two discharge gaps (07) and two sealing gaps (08), or comprising one coating blade (06) and two particle application openings, preferably two discharge gaps (07) and two sealing gaps (08).

The coater can be moved sequentially in at least two directions, and particulate material can be applied onto a construction field during each respective movement, and these steps can be repeated until the desired moulded part is produced.

In the method according to the invention, the coater is moved over the construction field in a first direction and a layer of particulate material is applied onto the construction field from the particle application opening in one direction, further known steps for layered construction and for selective solidification are carried out, then the coater is moved over the construction field in a second direction and a further layer of particulate material is applied onto the construction field from the particle application opening in a second direction, further known steps for layered construction and for selective solidification are again carried out, these steps are repeated until the moulded part has been formed, and further method steps follow, if necessary.

In the method according to the invention, the particle application openings are configured such that the particulate material is applied downwardly or laterally onto the construction field.

In the method according to the invention, the particle application opening preferably comprises a discharge gap and two sealing gaps.

In the method according to the invention, the particle application opening is preferably supplied with particulate material from one or more particle silos.

Using the method according to the invention, the particulate material is applied onto the construction field in that, during the movement, one coating blade each, which is intended to apply the particulate material onto the construction field, is made to oscillate by suitable means, e.g. an eccentric, and the particulate material is thereby applied onto the construction field.

In the method according to the invention, the coater may be used in a laterally tiltable manner, thereby adjusting a predetermined angle between the coating blade and the construction field.

Said angle can be adjusted to −5° to +5°, preferably to −1 to +1°.

In the method according to the invention, the angle is adjusted in a suitable manner and as required by the method. In a preferred embodiment, the angle is adjusted by tilting about an axis of rotation representing the axis formed by an overlap of the central particle application opening and the coating blade undersides.

The tilting may be effected by means of actuators.

In the method according to the invention, during the movement of the coater and the discharge of the particulate material, the coating blade sweeps over the construction field and levels the particulate material.

In a further aspect, the invention relates to a device for producing 3D moulded parts, comprising i. at least one coater (25) with two coating blades (06) and a particle application opening comprising one or two discharge gaps (07) and one or two sealing gaps (08), ii. at least one print head, iii. at least one silo (27) for particulate material, iv. at least one means for generating oscillations and v. a construction field (26), wherein the particle application opening is arranged substantially horizontally or vertically, or the device comprises a coater unit comprising vi. one or two silos (27), vii. two substantially horizontal or vertical particle application openings and two coating blades (06), as well as viii. at least one print head, ix. one or two means for generating oscillations and x. a construction field (26), and wherein the particle application opening(s), preferably comprising one or two discharge gaps (07) and one or two sealing gaps (08), are optionally switchable.

Preferably, the particle application opening is arranged substantially at the lower end of the silo(s).

The silo(s) or/and the particle application openings and coating blades are tiltable by suitable means about an axis, and an angle of −5° to +5° is adjustable between the construction field and each of the two coating blades.

In the device according to the invention, the silo(s), the particle application openings and the coating blades are individually tiltable and/or adjustable about an axis by suitable means.

Preferably, each coating blade is independently coupled with a means for generating oscillations.

The sealing gap and the discharge gap are adapted in a suitable manner to the requirements of the particulate material used and are preferably adjustable by means of a gap adjusting element to a width of 5 to 0 mm, preferably 3 to 1 mm.

In a preferred device, the components of the device can be arranged such that one coating blade and/or the silo can each carry out an oscillation.

The device is preferably configured such that said oscillation comprises vertical or/and horizontal components or/and is carried out substantially in the manner of a rotary motion.

In the device according to the invention, the unit consisting of silos, particle application openings, coating blades and means for generating oscillations is movable in two opposite directions and the application of particulate material is possible in both directions.

In a further aspect, the invention relates to a moulded part produced by a method according to the invention or by means of a device according to the invention.

In a still further aspect, the invention relates to a particle application unit for producing 3D moulded parts which comprises i. one or two particle application openings, which are arranged substantially horizontally or vertically, comprising one or two discharge gaps (07) and optionally one or two sealing gaps (08) or/and one or two gap adjusting elements (19), ii. two coating blades (06), iii. one or two particulate material silo(s), iv. one or two means for generating oscillations, and wherein the particle application unit comprises a means for tilting said unit about an angle.

Such a particle application unit can be combined with and integrated into known 3D printing devices.

In a preferred embodiment, the two coating blades (06) are provided as one single component (21) in the particle application unit.

Furthermore, the particle application unit may be combined with the other device elements described above, and reference is made explicitly to the features described above, which may be embodied accordingly in a particle application unit according to the invention.

LIST OF REFERENCE NUMERALS

1 Coater support
2 Joint, preferably a solid-body joint
3 Clamping element
4 Silo wall (particle reservoir)
5 Coating blade support
6 Coating blade
7 Discharge gap (particle application opening)
8 Sealing gap
9 Gap adjusting element
10 Movement direction of the gap adjusting element
11 Exchangeable coating blades for adjustment of the blade angle with respect to the construction field (optional)
12 Particulate material charge
12 Particulate material
13 Movement direction of the coater
13' a first direction
13" a second direction
14 Blade angle (angle)
15 Layer thickness of the applied particulate material layer
16 Cone seal
17 Bridge seal
18 Stiffening element
19 Gap adjusting slider (gap adjusting element)
20 Movement direction of gap adjusting slider
21 Single-component blade system
22 Movement direction of displaceable silo wall with coating blade support and coating blade
23 Opened gap adjusting slider
24 Closed gap adjusting slider
25 Coater (recoater)
26 Construction field
27 Silo (particle silo, particulate material silo)

What is claimed is:

1. A method of producing a 3D moulded part by means of a layer application technique, comprising the steps of:
   i) applying a layer of a particulate material onto a construction field with a coater device, while the coater devoice moves in a first direction; and
   ii) applying a layer of the particulate material on the construction field with the coater device, while the coater device moves in a different direction;
   wherein the coater device includes two coating blades and two particle application openings, wherein the number of the coating blades is two and the number of the particle application openings is two;
   wherein the steps of applying the particulate material in the first and different directions are repeated, wherein the steps of applying the particulate material in the first direction and the in the different direction employ different blades, different particle openings, or both;
   wherein the method includes a step of selectively solidifying the particulate material;
   wherein the steps for applying the particulate material and selectively solidifying the particulate material are repeated until the 3D moulded part has been formed;
   wherein each particle application openings extends from one particle reservoir or from different particle reservoirs;
   wherein the coater device includes two discharge gaps and two sealing gaps.

2. A method of producing a 3D moulded part by means of a layer application technique, comprising the steps of:
   i) applying a layer of a particulate material onto a construction field with a coater device, while the coater device moves in a first direction; and
   ii) applying a layer of the particulate material on the construction field with the coater device, while the coater device moves in a different direction;
   wherein the coater device includes one or two coating blades and one or two particle application openings, wherein:
   a) a number of the coating blades is two and a number of the particle application openings is one, or
   b) the number of the coating blades is two and the number of the particle application openings is two, or
   c) the number of the coating blades is one and the number of the particle application openings is one;
   wherein the steps of applying the particulate material in the first and different directions are repeated, wherein the steps of applying the particulate material in the first direction and the in the different direction employ different blades, different particle openings, or both;
   wherein the method includes a step of selectively solidifying the particulate material;
   wherein the steps for applying the particulate material and selectively solidifying the particulate material are repeated until the 3D moulded part has been formed;
   wherein each particle application openings extends from one particle reservoir or from different particle reservoirs;
   wherein the coater device include two discharge gaps and two sealing gaps.

* * * * *